US010644506B2

(12) United States Patent
Gu et al.

(10) Patent No.: US 10,644,506 B2
(45) Date of Patent: May 5, 2020

(54) GENERAL DISTRIBUTED CONTROL METHOD FOR MULTI-MICROGRIDS WITH PQ CONTROL AND DROOP CONTROL

(71) Applicant: SOUTHEAST UNIVERSITY, Nanjing (CN)

(72) Inventors: Wei Gu, Nanjing (CN); Ge Cao, Nanjing (CN); Wei Liu, Nanjing (CN); Zhi Wu, Nanjing (CN); Suyang Zhou, Nanjing (CN); Guannan Lou, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/763,733

(22) PCT Filed: Dec. 16, 2016

(86) PCT No.: PCT/CN2016/110479
§ 371 (c)(1),
(2) Date: Mar. 27, 2018

(87) PCT Pub. No.: WO2018/058804
PCT Pub. Date: Apr. 5, 2018

(65) Prior Publication Data
US 2019/0074691 A1    Mar. 7, 2019

(30) Foreign Application Priority Data

Sep. 27, 2016  (CN) .......................... 2016 1 0856013

(51) Int. Cl.
*H02J 3/06* (2006.01)
*H02J 3/38* (2006.01)
*G05B 17/02* (2006.01)

(52) U.S. Cl.
CPC ................ *H02J 3/06* (2013.01); *G05B 17/02* (2013.01); *H02J 3/381* (2013.01)

(58) Field of Classification Search
CPC .............. H02J 3/06; H02J 3/381; G05B 17/02
(Continued)

(56) References Cited

U.S. PATENT DOCUMENTS

2016/0179077 A1 * 6/2016 Le Boudec ........... H04L 41/046
700/295

FOREIGN PATENT DOCUMENTS

CN       205945057 U  *  2/2017  ............. Y02P 80/14

OTHER PUBLICATIONS

Bidram et al. (A. Bidram, F. L. Lewis and A. Davoudi, "Distributed Control Systems for Small-Scale Power Networks: Using Multiagent Cooperative Control Theory," in IEEE Control Systems Magazine, vol. 34, No. 6, pp. 56-77, Dec. 2014. doi: 10.1109/MCS.2014. 2350571) (Year: 2014).*

* cited by examiner

*Primary Examiner* — James J Lee
*Assistant Examiner* — Michael W Choi
(74) *Attorney, Agent, or Firm* — CBM Patent Consulting, LLC

(57) ABSTRACT

The invention discloses a general distributed control method for multi-microgrids with both PQ controlled and droop controlled distributed generators, which comprises the following steps of: step 10) conducting primary control to maintain the power balance of the multi-microgrids; step 20) determining predefined group consensus values of pinned agents; step 30) seeking group consensus among other agents and the pinned agents through communication coupling; and step 40) adjusting output powers to complete secondary control. Based on pinning control, the control (Continued)

method which adopts hierarchical control is a distributed control method for distributed power supply clusters with two control modes comprising PQ control and droop control. The method obviates the requirements for a central controller and complex communication topologies, reduces the number of the controllers, can be adapted to the communication topology changes in the multi-microgrids, and meets the plug-and-play requirement for the distributed power supply.

4 Claims, 14 Drawing Sheets

(58) Field of Classification Search
USPC .......................................................... 700/287
See application file for complete search history.

GENERAL DISTRIBUTED CONTROL METHOD FOR MULTI-MICROGRIDS WITH PQ CONTROL AND DROOP CONTROL

TECHNICAL FIELD

The present invention belongs to the field of microgrid operation control, and more particularly, to a general distributed control method for multi-microgrids with PQ control and droop control.

BACKGROUND

With the increasingly serious environmental and energy problems, the distributed power generation technology using renewable energy sources has been widely applied in power system. The microgrid is an energy system that comprises a distributed generator (DG), an energy storage device and local loads, and has a certain self-adjustment and control abilities. The multi-microgrids are an effective way to solve the related problems caused by high-density access of distributed power supplies, and will play an important role in the future smart distribution grid.

Special attentions have been paid on the stability and optimal control of the multi-microgrids recently. Control strategies based on a multi distributed generator agent (agent) system are recognized to be capable of playing an important role in maintaining the stability of the microgrids by control modes comprising centralized control and distributed control. There is a central controller in centralized control, which is used for handling a lot of data, and is easy to break down. The advantages of the distributed control comprise the ability to resist uncertainties and update distributed information, thus sharing information effectively, and ultimately making decision-making and implementation more rapid. Pinning control is an effective distributed control mode of the multi-distributed generator agent (agent) system, which can reduce the quantity of controllers of a large-scale complicated control system by pinning part of nodes, and it is difficult for the system to add a controller for all the nodes usually.

SUMMARY

Technical problems: the technical problem to be solved by the present invention is: to provide a general distributed control method for multi-microgrids with PQ control and droop control, wherein the control method comprises a droop-controlled distributed power supply and a PQ-controlled distributed power supply, eliminates the frequency and voltage errors generated by the conventional droop control when the multi-microgrids disturb, and achieves the power distribution of the distributed power supply clusters; meanwhile, the method obviates the requirements for a central controller and complex communication topologies; only part of the pin agents are controlled, and other agents are tracked and synchronized with the pinned agents through communication coupling, thus reducing the number of the controllers.

Technical solutions: to solve the above technical problems, the present invention adopts the following technical solutions.

A general distributed control method for multi-microgrids with PQ control and droop control is provided, wherein the multi-microgrids comprise m droop-controlled distributed power supply clusters and n PQ-controlled distributed power supply clusters; a multi-agent system is responsible for the control and mutual information interaction of the distributed power supplies in the multi-microgrids, each distributed power supply is corresponding to one agent, and the number of the distributed power supplies is the same as the number of the agents corresponding to the distributed power supplies; wherein, part of the agents are pinned and controlled, while other agents are tracked and synchronized in a distributed manner through communication coupling with the pinned agents; and the control method comprises the following steps of:

step 10) conducting primary control to maintain the power balance of the multi-microgrids;

step 20) determining predefined group consensus values of the pinned agents;

step 30) seeking group consensus among other agents excluding the pinned agents and the pinned agents through communication coupling; and step 40) adjusting output powers to complete secondary control.

As a preferred example, the step 10) specifically comprises: automatically conducting primary control as shown in formula (1) by the droop-controlled distributed power supply clusters when the multi-microgrids are disturbed in an islanded mode, and operating the droop-controlled distributed power supplies in a peer-to-peer control mode to maintain the power balance of the multi-microgrids:

$$f_i = f_{n,i} - m_{P,i}(P_i - P_{0,i})$$

$$U_i = U_{n,i} - n_{Q,i}(Q_i - Q_{0,i}) \quad \text{formula (1)}$$

where, $f_i$ indicates the frequency of the i-th droop-controlled distributed power supply, $f_{n,i}$ indicates the initial value of the frequency of the i-th droop-controlled distributed power supply, $m_{P,i}$ indicates the active droop coefficient of the i-th droop-controlled distributed power supply, $P_i$ indicates the active power outputted by the i-th droop-controlled distributed power supply, $P_{0,i}$ indicates the initial value of the active power of the i-th droop-controlled distributed power supply, and $U_i$ indicates the voltage of the i-th droop-controlled distributed power supply; $U_{n,i}$ indicates the reference value of the i-th droop-controlled distributed power supply; $n_{Q,i}$ indicates the reactive droop coefficient of the i-th droop-controlled distributed power supply; $Q_i$ indicates the reactive power outputted by the i-th droop-controlled distributed power supply; and $Q_{0,i}$ indicates the initial value of the reactive power of the i-th droop-controlled distributed power supply.

As a preferred example, the step 20) specifically comprises: determining the predefined group consensus values of the pinned agents under uncertain communication topologies, which comprises the pre-defined group consensus values of the droop-controlled pinned agents and the predefined group consensus values of the PQ-controlled pinned agents;

determining the distribution coefficients of the droop-controlled distributed power supply clusters according to formula (2):

$$\lambda_{k,D}^P = \frac{\sum_{k,i} \omega_{k,D,i} \sigma_{k,D,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P}, \quad \text{formula (2)}$$

$$\lambda_{k,D}^Q = \frac{\sum_{k,i} \omega_{k,D,i} \sigma_{k,D,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

where, $\lambda_{k,D}^P$ indicates the active distribution coefficient of the k-th droop-controlled distributed power supply cluster; $\omega_{k,D,i}$ indicates the participation factor of the agent i in the k-th droop-controlled distributed power supply cluster; if the distributed power supply corresponding to the agent i participates in secondary control, then $\omega_{k,D,i}=1$; otherwise, $\omega_{k,D,i}=0$; $\sigma_{k,D,i}^P$ indicates the active capacity of the agent i in the k-th droop-controlled distributed power supply cluster, $\omega_{k,PQ,i}$ indicates the participation factor of the agent i in the k-th PQ-controlled distributed power supply cluster; if the distributed power supply corresponding to the agent i participates in secondary control, then $\omega_{k,PQ,i}=1$, otherwise $\omega_{k,PQ,i}=0$; $\sigma_{k,PQ,i}^P$ indicates the active capacity of the agent i in the k-th PQ-controlled distributed power supply cluster, $\lambda_{k,D}^Q$ indicates the reactive distribution coefficient of the k-th droop-controlled distributed power supply cluster, $\sigma_{k,D,i}^Q$, indicates the reactive capacity of the agent i in the k-th droop-controlled distributed power supply cluster, and of, $\sigma_{k,PQ,i}^Q$ indicates the reactive capacity of the agent i in the k-th PQ-controlled distributed power supply cluster;

determining the distribution coefficients of the PQ-controlled distributed power supply clusters according to formula (3):

$$\lambda_{k,PQ}^P = \frac{\sum_{k,i} \omega_{k,PQ,i} \sigma_{k,PQ,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P}, \quad \text{formula (3)}$$

$$\lambda_{k,PQ}^Q = \frac{\sum_{k,i} \omega_{k,PQ,i} \sigma_{k,PQ,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

where, $\lambda_{k,PQ}^P$ indicates the active distribution coefficient of the k-th PQ-controlled distributed power supply cluster; $\omega_{k,PQ,i}$ indicates the participation factor of the agent i in the k-th PQ-controlled distributed power supply cluster; if the distributed power supply participates in secondary control, then $\omega_{k,PQ,i}=1$; otherwise $\omega_{k,PQ,i}=0$; $\sigma_{k,PQ,i}^P$ indicates the active capacity of the agent i in the PQ-controlled distributed power supply cluster, $\lambda_{k,PQ,i}^Q$ indicates the reactive distribution coefficient of the k-th PQ-controlled distributed power supply cluster, and $\sigma_{k,PQ,i}^Q$ indicates the reactive capacity of the agent i in the k-th PQ-controlled distributed power supply cluster;

determining the pre-defined group consensus values of the droop-controlled pinned agents according to formula (4):

$$\Delta P_{k,D}^* = \frac{\lambda_{k,D}^P \Delta P_{MG}^*}{\eta_{k,D}} \quad \Delta Q_{k,D}^* = \frac{\lambda_{k,D}^Q \Delta Q_{MG}^*}{\eta_{k,D}} \quad \text{formula (4)}$$

$$\Delta f_k^* = m_{P,i} \Delta P_{k,D}^* \quad \Delta U_k^* = n_{Q,i} \Delta Q_{k,D}^*$$

where, $\Delta P_{k,D}^*$ indicates the preset active group consensus value of the k-th droop-controlled distributed power supply cluster, $\Delta P_{MG}^*$ indicates the active deficiencies in the entire multi-microgrids, $\eta_{k,D}$ indicates the total number of nonzero participation factors in the k-th droop-controlled distributed power supply cluster, $\Delta Q_{k,D}^*$ indicates the preset reactive group consensus value of the k-th droop-controlled distributed power supply cluster, $\Delta Q_{MG}^*$ indicates the reactive deficiencies in the entire multi-microgrids, $\Delta f_k^*$ indicates the preset frequency group consensus value of the k-th droop-controlled distributed power supply cluster, $\Delta U_k^*$ indicates the preset voltage group consensus value of the k-th droop-controlled distributed power supply cluster, $m_{P,i}$ indicates an active droop coefficient, and $n_{Q,i}$ indicates a reactive droop coefficient;

determining the pre-defined group consensus values of the PQ-controlled pinned agents according to formula (5):

$$\Delta P_{k,PQ}^* = \frac{\lambda_{k,PQ}^P \Delta P_{MG}^*}{\eta_{k,PQ}}, \quad \Delta Q_{k,PQ}^* = \frac{\lambda_{k,PQ}^Q \Delta Q_{MG}^*}{\eta_{k,PQ}} \quad \text{formula (5)}$$

where, $\Delta P_{k,PQ}^*$ indicates the preset active group consensus value of the k-th PQ-controlled distributed power supply cluster, $\Delta P_{MG}^*$ indicates the active deficiencies in the entire multi-microgrids, and $\eta_{k,PQ}$ indicates the total number of nonzero participation factors in the k-th PQ-controlled distributed power supply cluster; $\Delta Q_{k,PQ}^*$ indicates the preset reactive group consensus value of the k-th PQ-controlled distributed power supply cluster, and $\Delta Q_{MG}^*$ indicates the reactive deficiencies in the entire multi-microgrids.

As a preferred example, the step 30) specifically comprises: tracking and synchronizing other agents in and among the distributed power supply clusters with the pinned agents through pinning control, so as to seek and reach the pre-defined group consensus;

determining the control error $e_{fUk,i}$ of the i-th droop-controlled distributed power supply agent according to formula (6):

$$e_{fUK,i} = \begin{bmatrix} e_{fk,i} \\ e_{Uk,i} \end{bmatrix} = \begin{bmatrix} \Delta f_{n,i} - \Delta f_k^* \\ \Delta U_{n,i} - \Delta U_k^* \end{bmatrix} \quad \text{formula (6)}$$

where, $e_{fk,i}$ indicates the frequency control error of the i-th droop-controlled distributed power supply agent, $e_{Uk,i}$ indicates the voltage control error of the i-th droop-controlled distributed power supply agent, $\Delta f_{n,i}$ indicates the frequency correction of the i-th droop-controlled distributed power supply agent in the secondary control, and $\Delta U_{n,i}$ indicates the voltage correction of the i-th droop-controlled distributed power supply agent in the secondary control;

determining the control error $e_{PQk,i}$ of the i-th PQ-controlled distributed power supply agent according to formula (7):

$$e_{PQk,i} = \begin{bmatrix} e_{Pk,i} \\ e_{Qk,i} \end{bmatrix} = \begin{bmatrix} \Delta P_{ref,i} - \Delta P_{k,PQ}^* \\ \Delta Q_{ref,i} - \Delta Q_{k,PQ}^* \end{bmatrix} \quad \text{formula (7)}$$

where, $e_{Pk,i}$ indicates the active power control error of the i-th PQ-controlled distributed power supply agent, $e_{Qk,i}$ indicates the reactive power control error of the i-th PQ-controlled distributed power supply agent, $\Delta P_{ref,i}$ indicates the active power correction of the i-th PQ-controlled distributed power supply agent in the secondary control, and $\Delta Q_{ref,i}$ indicates the reactive power correction of the i-th PQ-controlled distributed power supply agent in the secondary control;

conducting pinning control to the agent i in the k-th droop-controlled distributed power supply cluster through formula (8):

$$\dot{e}_{fUk,i} = \begin{cases} \sum_{j \in N_{k,i,\Theta_m(t)}} \alpha_{i,j,\Theta_m(t)}(e_{fk,j} - e_{fk,i}) + \sum_{l \neq k} \sum_{j \in N_{l,i,\Theta_m(t)}} \beta_{i,j,\Theta_m(t)}(e_{fk,j} - e_{fk,i}) - d_{i,\Theta_m(t)} e_{fk,i} \\ \sum_{j \in N_{k,i,\Theta_m(t)}} \alpha_{i,j,\Theta_m(t)}(e_{Uk,j} - e_{Uk,i}) + \sum_{l \neq k} \sum_{j \in N_{l,i,\Theta_m(t)}} \beta_{i,j,\Theta_m(t)}(e_{Uk,j} - e_{Uk,i}) - d_{i,\Theta_m(t)} e_{Uk,i} \end{cases} \quad \text{formula (8)}$$

where, $\dot{e}_{fUk,i}$ indicates the derivative of $e_{fUK,i}$, $N_{k,i,\Theta_m(t)}$ indicates an agent set in the k-th distributed power supply cluster neighboring the agent i at time $t_m$, $\alpha_{i,j,\Theta_m(t)}$ indicates a communication coupling coefficient between the agent i and other agents in the cluster at time $t_m$; if communication lines switch on, then $\alpha_{i,j,\Theta_m(t)} \neq 0$; otherwise, $\alpha_{i,j,\Theta_m(t)} = 0$; $e_{fk,j}$ indicates the frequency control error of the droop-controlled distributed power supply agent j, and $N_{l,i,\Theta_m(t)}$ indicates an agent set in the i-th distributed power supply cluster neighboring the agent i at time $t_m$; $\beta_{i,j,\Theta_m(t)}$ indicates a communication coupling coefficient between the agent i and the agents in other clusters at time $t_m$, and if communication lines switch on, $\beta_{i,j,\Theta_m(t)} \neq 0$; otherwise, $\beta_{i,j,\Theta_m(t)} = 0$; $d_{i,\Theta_m(t)}$ indicates the pinning control gain of the agent i at time $t_m$, and $d_{i,\Theta_m(t)} \geq 0$; $d_{i,\Theta_m(t)} = 0$ indicates no pinning control over the agent i; and $e_{Uk,j}$ indicates the voltage control error of the droop-controlled distributed power supply agent j; and conducting pinning control to the agent i in the k-th PQ-controlled distributed power supply cluster through formula (9):

$$\dot{e}_{PQk,i} = \begin{cases} \sum_{j \in N_{k,i,\Theta_m(t)}} \alpha_{i,j,\Theta_m(t)}(e_{Pk,j} - e_{Pk,i}) + \sum_{l \neq k} \sum_{j \in N_{l,i,\Theta_m(t)}} \beta_{i,j,\Theta_m(t)}(e_{Pk,j} - e_{Pk,i}) - d_{i,\Theta_m(t)} e_{Pk,i} \\ \sum_{j \in N_{k,i,\Theta_m(t)}} \alpha_{i,j,\Theta_m(t)}(e_{Qk,j} - e_{Qk,i}) + \sum_{l \neq k} \sum_{j \in N_{l,i,\Theta_m(t)}} \beta_{i,j,\Theta_m(t)}(e_{Qk,j} - e_{Qk,i}) - d_{i,\Theta_m(t)} e_{Qk,i} \end{cases} \quad \text{formula (9)}$$

where, $\dot{e}_{PQk,i}$ indicates the derivative of $e_{PQk,i}$, $e_{Pk,j}$ indicates the active power control error of the PQ-controlled distributed power supply agent j, and $e_{Qk,j}$ indicates the reactive power control error of the PQ-controlled distributed power supply agent j.

As a preferred example, the step 40) specifically comprises: adjusting an output power by each distributed power supply agent according to the pre-defined group consensus values reached and based on the PQ-controlled distributed power supplies, and recovering the system frequency and voltage based on the droop-controlled distributed power supplies, so as to complete the secondary control over the multi-microgrids together;

conducting the secondary control over the droop-controlled distributed power supply agent i according to formula (10):

$$f_{n,i}{}^S = f_{n,i} + \Delta f_{n,i}$$

$$U_{n,i}{}^S = U_{n,i} + \Delta U_{n,i} \quad \text{formula (10)}$$

where, $f_{n,i}{}^S$ indicates the reference frequency value of the droop-controlled distributed power supply agent i adjusted through the secondary control, $f_{n,i}$ indicates the reference frequency value of the droop-controlled distributed power supply agent i in the primary control, $\Delta f_{n,i}$ indicates the frequency correction of the droop-controlled distributed power supply agent i in the secondary control, $U_{n,i}{}^S$ indicates the reference voltage value of the droop-controlled distributed power supply agent i adjusted through the secondary control, $U_{n,i}$ indicates the reference voltage value of the droop-controlled distributed power supply agent i in the primary control, and $\Delta U_{n,i}$ indicates the voltage correction of the droop-controlled distributed power supply agent i in the secondary control; and conducting the secondary control over the PQ-controlled distributed power supply agent i according to formula (11):

$$P_{ref,i}{}^S = P_{ref,i} + \Delta P_{ref,i}$$

$$Q_{ref,i}{}^S = Q_{ref,i} + \Delta Q_{ref,i} \quad \text{formula (11)}$$

where, $P_{ref,i}{}^S$ indicates the active reference value of the PQ-controlled distributed power supply agent i adjusted through the secondary control, $P_{ref,i}$ indicates the initial active reference value of the PQ-controlled distributed power supply agent i, $\Delta P_{ref,i}$ indicates the active power correction of the PQ-controlled distributed power supply agent i in the secondary control, $Q_{ref,i}{}^S$ indicates the reactive reference value of the PQ-controlled distributed power supply agent i adjusted through the secondary control, $Q_{ref,i}$ indicates the initial reactive reference value of the PQ-controlled distributed power supply agent i, and $\Delta Q_{ref,I}$ indicates the reactive power correction of the PQ-controlled distributed power supply agent i in secondary control.

Beneficial effects: compared with the prior art, the present invention has the following beneficial effects: the general distributed control method for multi-microgrids with PQ control and droop control of the present invention is targeted at multi-microgrids and distributed power supply clusters, which can control when the system disturbs, so as to recover the system frequency and voltage, and maintain the system stability. Based on the hierarchical control of primary control and secondary control, the embodiments of the present invention adopt a cluster concept to conduct the pinning control based on the multi-agent system, which is a distributed control method that obviates the requirements for a central controller and complex communication topologies, reduces the number of the controllers, and meets the plug-and-play requirement for the distributed power supply. The control method provided by the present invention can achieve the global coordination and local autonomy of the distributed power clusters and improve the reliability and adaptability of the multi-microgrids by conducting the pinning-based group consensus process in and among the distributed power supply clusters, collaboratively recovering the system frequency and voltage by the droop-controlled distributed power supply clusters and collaboratively sharing the power deficiencies by the PQ-controlled distributed power supply clusters. The method of the present invention can achieve the global coordination control and local autonomous control of the multi-microgrids and the distributed power supply clusters, and is a general method with two control modes comprising PQ control and droop control.

DETAILED DESCRIPTION

In order to make the objects, technical solutions and advantages of the invention more clearly, the invention is described in detail hereinafter with reference to the accompanying drawings and embodiments. It should be understood that the specific implementation examples described herein are only used to explain the invention, but are not intended to limit the invention.

In the embodiment of the present invention, the multi-microgrids comprise m droop-controlled distributed power supply clusters and n PQ-controlled distributed power supply clusters; a multi-agent system is responsible for the control and mutual information interaction of the distributed power supplies in the multi-microgrids, each distributed power supply is corresponding to one agent, and the number of the distributed power supplies is the same as the number of the agents corresponding to the distributed power supplies; wherein, part of the agents are controlled pinned agent, while other agents are tracked and synchronized in a distributed manner through communication coupling with the pinned agents.

Figure 1:
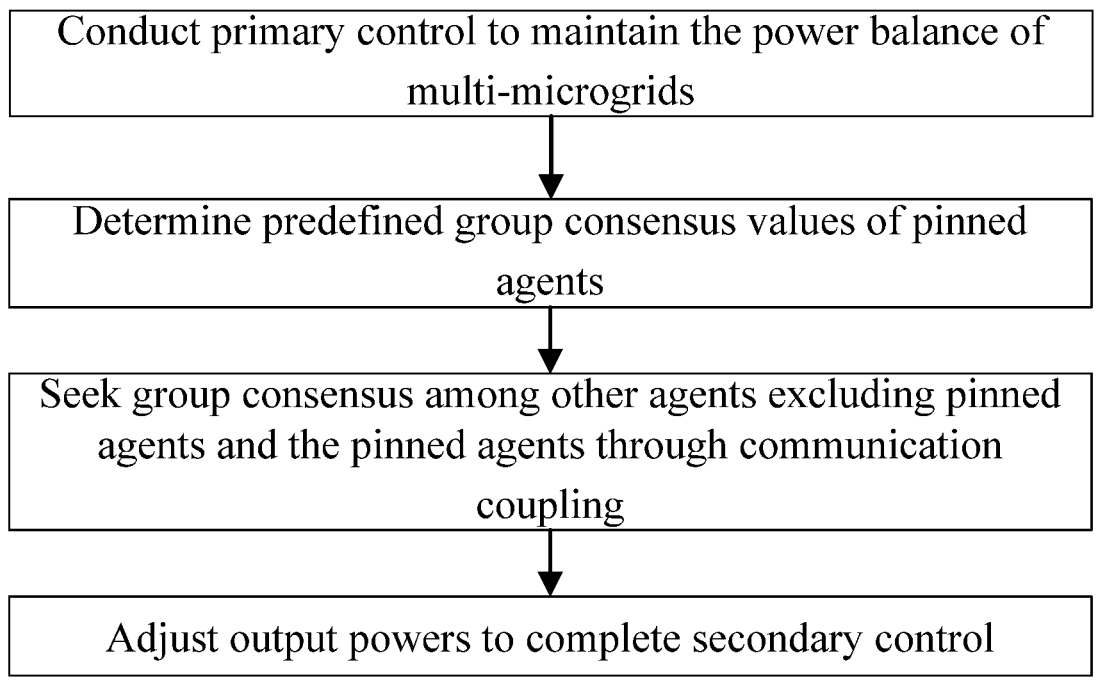
FIG. 1 is a block flow diagram of the present invention.

As shown in FIG. 1, a general distributed control method for multi-microgrids with PQ control and droop control of the embodiment of the present invention comprises the following steps.

In step 10), primary control is conducted to maintain the power balance of the multi-microgrids.

The step 10) specifically comprises: automatically conducting primary control as shown in formula (1) by the droop-controlled distributed power supply clusters when the multi-microgrids are disturbed in an islanded mode, and operating the droop-controlled distributed power supplies in a peer-to-peer control mode to maintain the power balance of the multi-microgrids:

$$f_i = f_{n,i} - m_{P,i}(P_i - P_{0,i})$$

$$U_i = U_{n,i} - n_{Q,i}(Q_i - Q_{0,i}) \quad \text{formula (1)}$$

where, $f_i$ indicates the frequency of the i-th droop-controlled distributed power supply, $f_{n,i}$ indicates the initial value of the frequency of the i-th droop-controlled distributed power supply, $m_{P,i}$ indicates the active droop coefficient of the i-th droop-controlled distributed power supply, $P_i$ indicates the active power outputted by the i-th droop-controlled distributed power supply, $P_{0,i}$ indicates the initial value of the active power of the i-th droop-controlled distributed power supply, and $U_i$ indicates the voltage of the i-th droop-controlled distributed power supply; $U_{n,i}$ indicates the reference value of the i-th droop-controlled distributed power supply; $n_{Q,i}$ indicates the reactive droop coefficient of the i-th droop-controlled distributed power supply; $Q_i$ indicates the reactive power outputted by the i-th droop-controlled distributed power supply; and $Q_{0,i}$ indicates the initial value of the reactive power of the i-th droop-controlled distributed power supply.

In step 20), predefined group consensus values of the pinned agents are determined.

The step 20) specifically comprises: determining the predefined group consensus values of the pinned agents under uncertain communication topologies, which comprises the pre-defined group consensus values of the droop-controlled pinned agents and the pre-defined group consensus values of the PQ-controlled pinned agents;

determining the distribution coefficients of the droop-controlled distributed power supply clusters according to formula (2):

$$\lambda_{k,D}^P = \frac{\sum_{k,i} \omega_{k,D,i} \sigma_{k,D,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P},$$

$$\lambda_{k,D}^Q = \frac{\sum_{k,i} \omega_{k,D,i} \sigma_{k,D,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

formula (2)

where, $\lambda_{k,D}^P$ indicates the active distribution coefficient of the k-th droop-controlled distributed power supply cluster; $\omega_{k,D,i}$ indicates the participation factor of the agent i in the k-th droop-controlled distributed power supply cluster; if the distributed power supply corresponding to the agent i participates in secondary control, then $\omega_{k,D,i}=1$; otherwise, $\omega_{k,D,i}=0$; $\sigma_{k,D,i}^P$ indicates the active capacity of the agent i in the k-th droop-controlled distributed power supply cluster, $\omega_{k,PQ,i}$ indicates the participation factor of the agent i in the k-th PQ-controlled distributed power supply cluster; if the distributed power supply corresponding to the agent i participates in secondary control, then $\omega_{k,PQ,i}=1$, otherwise $\omega_{k,PQ,i}=0$; $\sigma_{k,PQ,i}^P$ indicates the active capacity of the agent i in the k-th PQ-controlled distributed power supply cluster, $\lambda_{k,D}^Q$ indicates the reactive distribution coefficient of the k-th droop-controlled distributed power supply cluster, $\sigma_{k,D,i}^Q$ indicates the reactive capacity of the agent i in the k-th droop-controlled distributed power supply cluster, and $\sigma_{k,D,i}^Q$ indicates the reactive capacity of the agent i in the k-th PQ-controlled distributed power supply cluster;

determining the distribution coefficients of the PQ-controlled distributed power supply clusters according to formula (3):

$$\lambda_{k,PQ}^P = \frac{\sum_{k,i} \omega_{k,PQ,i} \sigma_{k,PQ,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P},$$

$$\lambda_{k,PQ}^Q = \frac{\sum_{k,i} \omega_{k,PQ,i} \sigma_{k,PQ,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

formula (3)

where, $\lambda_{k,PQ}^P$ indicates the active distribution coefficient of the k-th PQ-controlled distributed power supply cluster; $\omega_{k,PQ,i}$ indicates the participation factor of the agent i in the k-th PQ-controlled distributed power supply cluster; if the distributed power supply participates in secondary control, then $\omega_{k,PQ,i}=1$; otherwise $\omega_{k,PQ,i}=0$; $\sigma_{k,PQ,i}^P$, indicates the active capacity of the agent i in the PQ-controlled distributed power supply cluster, $\lambda_{k,PQ}^Q$ indicates the reactive distribution coefficient of the k-th PQ-controlled distributed power supply cluster, and $\sigma_{k,PQ,i}^Q$ indicates the reactive capacity of the agent i in the k-th PQ-controlled distributed power supply cluster;

determining the pre-defined group consensus values of the droop-controlled pinned agents according to formula (4):

$$\Delta P_{k,D}^* = \frac{\lambda_{k,D}^P \Delta P_{MG}^*}{\eta_{k,D}}, \quad \Delta Q_{k,D}^* = \frac{\lambda_{k,D}^Q \Delta Q_{MG}^*}{\eta_{k,D}}$$

$$\Delta f_k^* = m_{P,i} \Delta P_{k,D}^*, \quad \Delta U_k^* = n_{Q,i} \Delta Q_{k,D}^*$$

formula (4)

where, $\Delta P_{k,D}^*$ indicates the preset active group consensus value of the k-th droop-controlled distributed power supply cluster, $\Delta P_{MG}^*$ indicates the active deficiencies in the entire multi-microgrids, $\eta_{k,D}$ indicates the total number of nonzero participation factors in the k-th droop-controlled distributed power supply cluster, $\Delta Q_{k,D}^*$ indicates the preset reactive group consensus value of the k-th droop-controlled distributed power supply cluster, $\Delta Q_{MG}^*$ indicates the reactive deficiencies in the entire multi-microgrids, $\Delta f_k^*$ indicates the preset frequency group consensus value of the k-th droop-controlled distributed power supply cluster, $\Delta U_k^*$ indicates the preset voltage group consensus value of the k-th droop-controlled distributed power supply cluster, $m_{P,i}$ indicates an active droop coefficient, and $n_{Q,i}$ indicates a reactive droop coefficient;

determining the pre-defined group consensus values of the PQ-controlled pinned agents according to formula (5):

$$\Delta P_{k,PQ}^* = \frac{\lambda_{k,PQ}^P \Delta P_{MG}^*}{\eta_{k,PQ}}, \quad \Delta Q_{k,PQ}^* = \frac{\lambda_{k,PQ}^Q \Delta Q_{MG}^*}{\eta_{k,PQ}}$$

formula (5)

where, $\Delta P_{k,PQ}^*$ indicates the preset active group consensus value of the k-th PQ-controlled distributed power supply cluster, $\Delta P_{MG}^*$ indicates the active deficiencies in the entire multi-microgrids, and $\eta_{k,PQ}$ indicates the total number of nonzero participation factors in the k-th PQ-controlled distributed power supply cluster; $\Delta Q_{k,PQ}^*$ indicates the preset reactive group consensus value of the k-th PQ-controlled distributed power supply cluster, and $\Delta Q_{MG}^*$ indicates the reactive deficiencies in the entire multi-microgrids.

In step 30) group consensus among other agents excluding the pinned agents and the pinned agents are sought through communication coupling.

The step 30) specifically comprises: tracking and synchronizing other agents in and among the distributed power supply clusters with the pinned agents through pinning control, so as to seek and reach the pre-defined group consensus;

determining the control error $e_{fUk,i}$ of the i-th droop-controlled distributed power supply agent according to formula (6):

$$e_{fUK,i} = \begin{bmatrix} e_{fk,i} \\ e_{Uk,i} \end{bmatrix} = \begin{bmatrix} \Delta f_{n,i} - \Delta f_k^* \\ \Delta U_{n,i} - \Delta U_k^* \end{bmatrix}$$

formula (6)

where, $e_{fk,i}$ indicates the frequency control error of the i-th droop-controlled distributed power supply agent, $e_{Uk,i}$ indicates the voltage control error of the i-th droop-controlled distributed power supply agent, $\Delta f_{n,i}$ indicates the frequency correction of the i-th droop-controlled distributed power supply agent in the secondary control, and $\Delta U_{n,i}$ indicates the voltage correction of the i-th droop-controlled distributed power supply agent in the secondary control;

determining the control error $e_{PQk,i}$ of the i-th PQ-controlled distributed power supply agent according to formula (7):

$$e_{PQk,i} = \begin{bmatrix} e_{Pk,i} \\ e_{Qk,i} \end{bmatrix} = \begin{bmatrix} \Delta P_{ref,i} - \Delta P^*_{k,PQ} \\ \Delta Q_{ref,i} - \Delta Q^*_{k,PQ} \end{bmatrix} \quad \text{formula (7)}$$

where, $e_{Pk,i}$ indicates the active power control error of the i-th PQ-controlled distributed power supply agent, $e_{Qk,i}$ indicates the reactive power control error of the i-th PQ-controlled distributed power supply agent, $\Delta P_{ref,i}$ indicates the active power correction of the i-th PQ-controlled distributed power supply agent in the secondary control, and $\Delta Q_{ref,i}$ indicates the reactive power correction of the i-th PQ-controlled distributed power supply agent in the secondary control;

conducting pinning control to the agent i in the k-th droop-controlled distributed power supply cluster through formula (8):

$$\dot{e}_{fUk,i} = \quad \text{formula (8)}$$

$$\begin{cases} \sum_{j \in N_{k,i,\Theta_m(t)}} \alpha_{i,j,\Theta_m(t)}(e_{fk,j} - e_{fk,i}) + \sum_{l \neq k} \sum_{j \in N_{l,i,\Theta_m(t)}} \beta_{i,j,\Theta_m(t)}(e_{fk,j} - e_{fk,i}) - d_{i,\Theta_m(t)} e_{fk,i} \\ \sum_{j \in N_{k,i,\Theta_m(t)}} \alpha_{i,j,\Theta_m(t)}(e_{Uk,j} - e_{Uk,i}) + \sum_{l \neq k} \sum_{j \in N_{l,i,\Theta_m(t)}} \beta_{i,j,\Theta_m(t)}(e_{Uk,j} - e_{Uk,i}) - d_{i,\Theta_m(t)} e_{Uk,i} \end{cases}$$

where, $\dot{e}_{fUk,i}$ indicates the derivative of $e_{fUk,i}$, $N_{k,i,\Theta_m(t)}$ indicates an agent set in the k-th distributed power supply cluster neighboring the agent i at time $t_m$, $\alpha_{i,j,\Theta_m(t)}$ indicates a communication coupling coefficient between the agent i and other agents in the cluster at time $t_m$; if communication lines switch on, then $\alpha_{i,j,\Theta_m(t)} \neq 0$; otherwise, $\alpha_{i,j,\Theta_m(t)} = 0$; $e_{fk,j}$ indicates the frequency control error of the droop-controlled distributed power supply agent j, and $N_{l,i,\Theta_m(t)}$ indicates an agent set in the i-th distributed power supply cluster neighboring the agent i at time $t_m$; $\beta_{i,j,\Theta_m(t)}$ indicates a communication coupling coefficient between the agent i and the agents in other clusters at time $t_m$, and if communication lines switch on, $\beta_{i,j,\Theta_m(t)} \neq 0$; otherwise, $\beta_{i,j,\Theta_m(t)} = 0$; $d_{i,\Theta_m(t)}$ indicates the pinning control gain of the agent i at time $t_m$, and $d_{i,\Theta_m(t)} \geq 0$; $d_{i,\Theta_m(t)} = 0$ indicates no pinning control over the agent i; and $e_{Uk,j}$ indicates the voltage control error of the droop-controlled distributed power supply agent j; and conducting pinning control to the agent i in the k-th PQ-controlled distributed power supply cluster through formula (9):

$$\dot{e}_{PQk,i} = \quad \text{formula (9)}$$

$$\begin{cases} \sum_{j \in N_{k,i,\Theta_m(t)}} \alpha_{i,j,\Theta_m(t)}(e_{Pk,j} - e_{Pk,i}) + \sum_{l \neq k} \sum_{j \in N_{l,i,\Theta_m(t)}} \beta_{i,j,\Theta_m(t)}(e_{Pk,j} - e_{Pk,i}) - d_{i,\Theta_m(t)} e_{Pk,i} \\ \sum_{j \in N_{k,i,\Theta_m(t)}} \alpha_{i,j,\Theta_m(t)}(e_{Qk,j} - e_{Qk,i}) + \sum_{l \neq k} \sum_{j \in N_{l,i,\Theta_m(t)}} \beta_{i,j,\Theta_m(t)}(e_{Qk,j} - e_{Qk,i}) - d_{i,\Theta_m(t)} e_{Qk,i} \end{cases}$$

where, $\dot{e}_{PQk,i}$ indicates the derivative of $e_{PQk,i}$, $e_{Pk,j}$ indicates the active power control error of the PQ-controlled distributed power supply agent j, and $e_{Qk,j}$ indicates the reactive power control error of the PQ-controlled distributed power supply agent j.

In step 40) an output power is adjusted to complete secondary control.

The step 40) specifically comprises: adjusting an output power by each distributed power supply agent according to the pre-defined group consensus values reached and based on the PQ-controlled distributed power supplies, and recovering the system frequency and voltage based on the droop-controlled distributed power supplies, so as to complete the secondary control over the multi-microgrids together;

conducting the secondary control over the droop-controlled distributed power supply agent i according to formula (10):

$$f_{n,i}^S = f_{n,i} \Delta f_{n,i}$$

$$U_{n,i}^S = U_{n,i} + \Delta U_{n,i} \quad \text{formula (10)}$$

where, $f_{n,i}^S$ indicates the reference frequency value of the droop-controlled distributed power supply agent i adjusted through the secondary control, $f_{n,i}$ indicates the reference frequency value of the droop-controlled distributed power supply agent i in the primary control, $\Delta f_{n,i}$ indicates the frequency correction of the droop-controlled distributed power supply agent i in the secondary control, $U_{n,i}^S$ indicates the reference voltage value of the droop-controlled distributed power supply agent i adjusted through the secondary control, $U_{n,i}$ indicates the reference voltage value of the droop-controlled distributed power supply agent i in the primary control, and $\Delta U_{n,i}$ indicates the voltage correction of the droop-controlled distributed power supply agent i in the secondary control; and conducting the secondary control over the PQ-controlled distributed power supply agent i according to formula (11):

$$P_{ref,i}^S = P_{ref,i} + \Delta P_{ref,i}$$

$$Q_{ref,i}^S = Q_{ref,i} + \Delta Q_{ref,i} \quad \text{formula (11)}$$

where, $P_{ref,i}^S$ indicates the active reference value of the PQ-controlled distributed power supply agent i adjusted through the secondary control, $P_{ref,i}$ indicates the initial active reference value of the PQ-controlled distributed power supply agent i, $\Delta P_{ref,i}$ indicates the active power correction of the PQ-controlled distributed power supply agent i in the secondary control, $Q_{ref,i}^S$ indicates the reactive reference value of the PQ-controlled distributed power supply agent i adjusted through the secondary control, $Q_{ref,i}$ indicates the initial reactive reference value of the PQ-controlled distributed power supply agent i, and $\Delta Q_{ref,i}$ indicates the reactive power correction of the PQ-controlled distributed power supply agent i in secondary control.

Based on the hierarchical control of primary control and secondary control, the control method of the present invention is targeted at multi-microgrids and distributed power supply clusters, and adopts a cluster concept to conduct the multi-agent system based pinning control. The control method can achieve the global coordination and local autonomy of the distributed power clusters, reduce the number of the controllers and the complex communication topologies and improve the reliability and adaptability of the multi-microgrids by conducting the pinning-based group consensus process in and among the distributed power supply clusters, collaboratively recovering the system frequency and voltage by the droop-controlled distributed power supply clusters and collaboratively sharing the power deficiencies by the PQ-controlled distributed power supply clusters.

One embodiment is enumerated hereinafter.

Figure 2A:
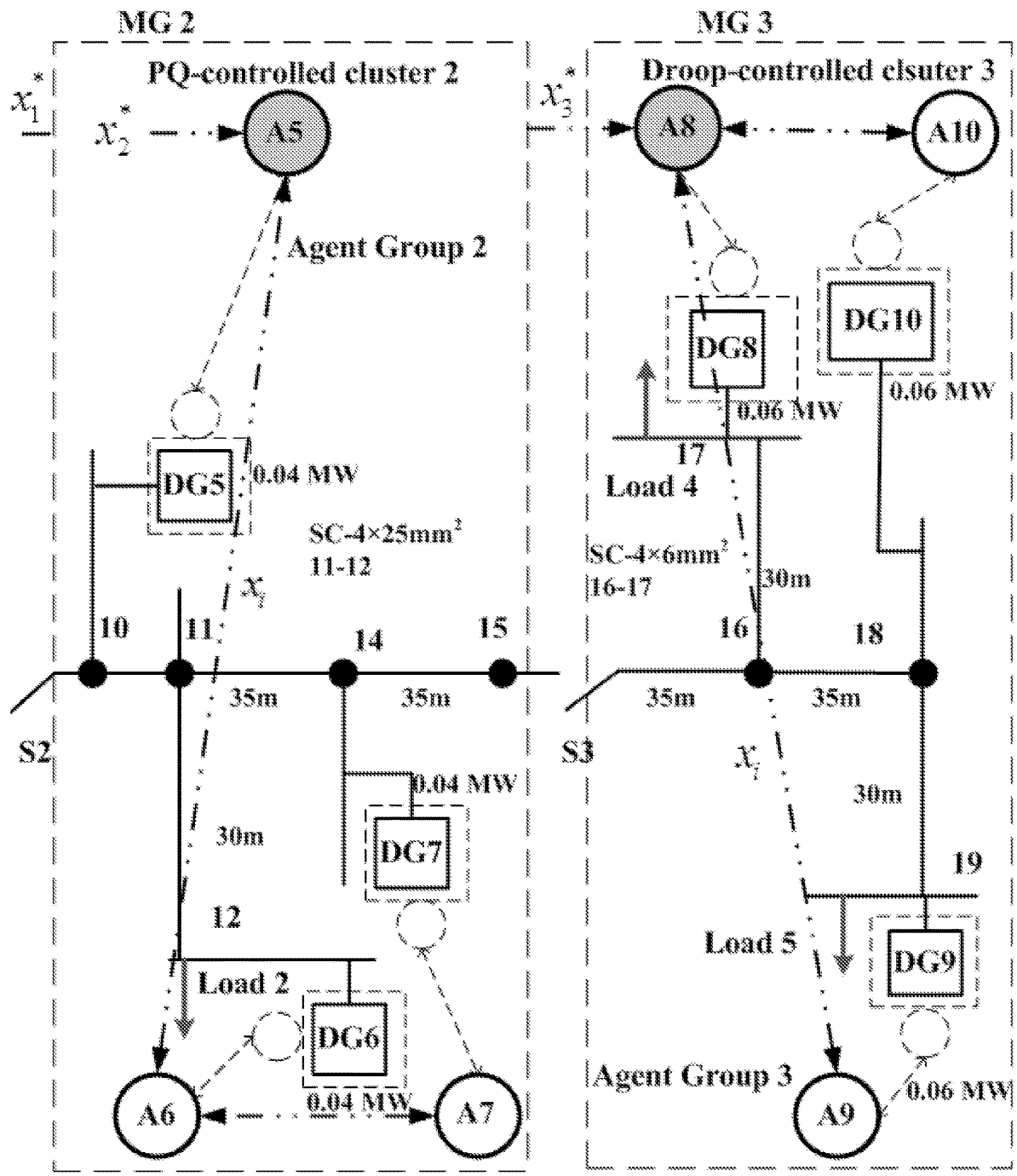
FIG. 2A is a left partial schematic structural diagram of a multi-microgrids simulation system according to the embodiment of the present invention.
Figure 2B:
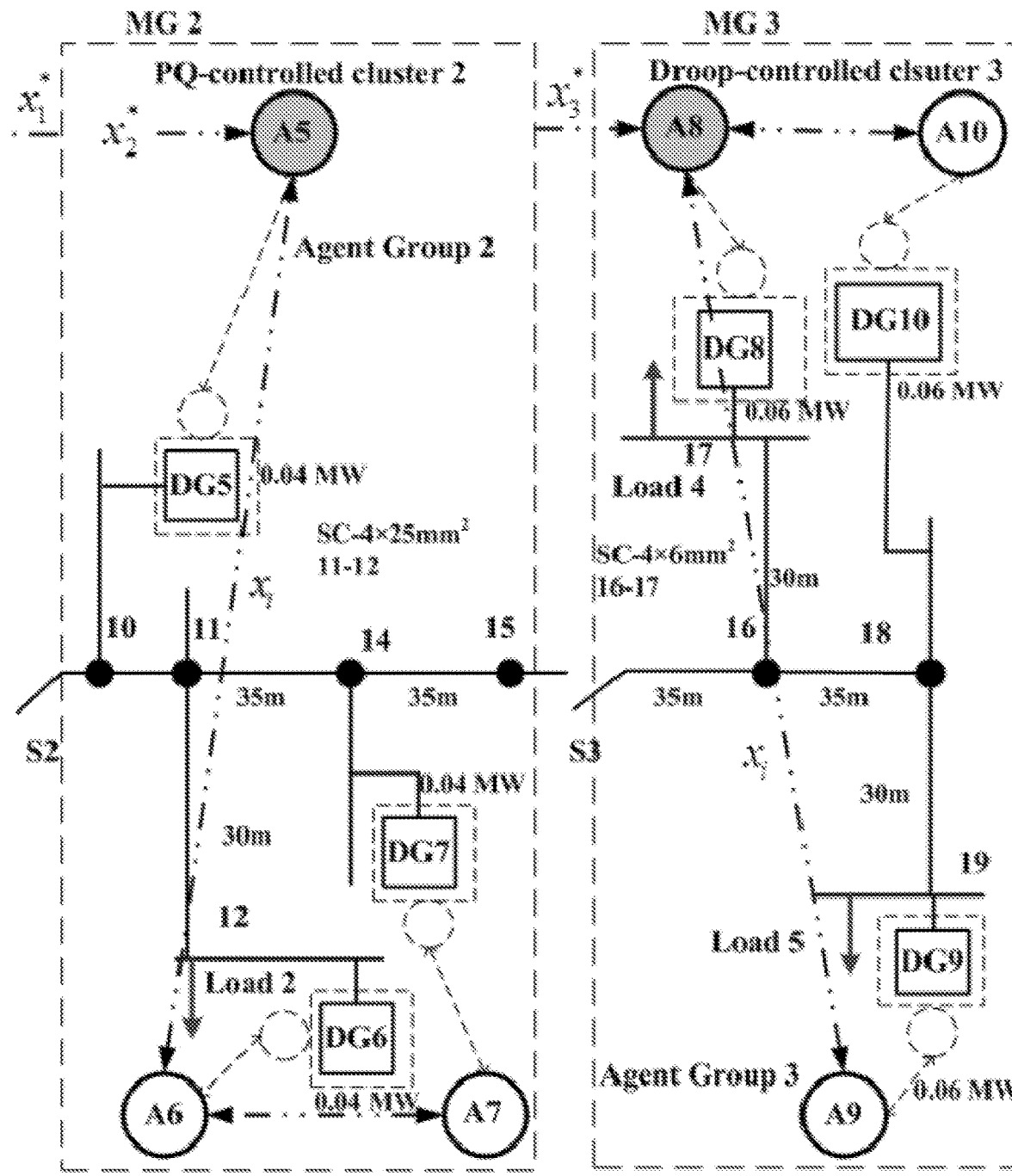
FIG. 2B is a right partial schematic structural diagram of a multi-microgrids simulation system according to the embodiment of the present invention
Figure 3:
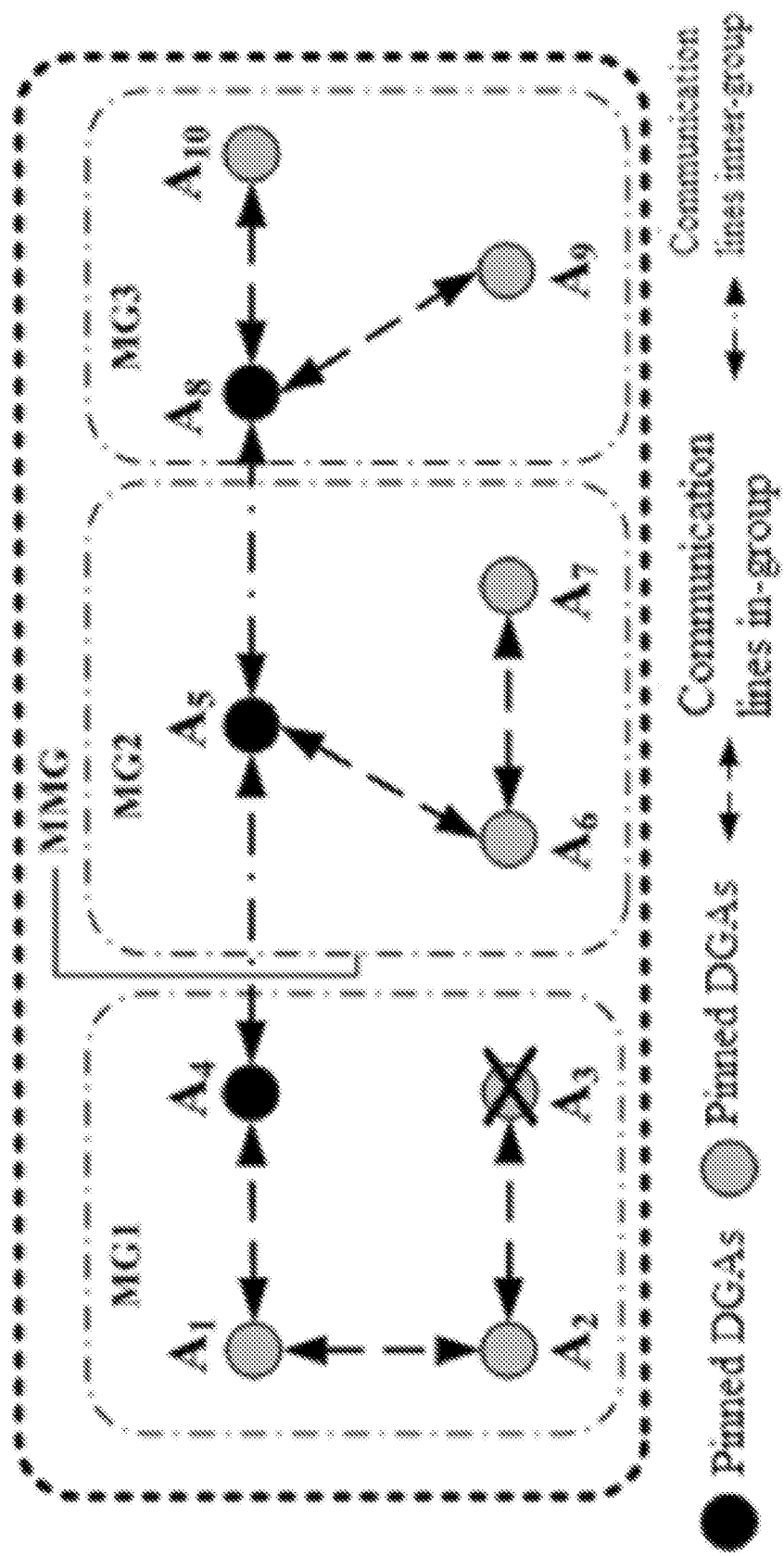
FIG. 3 is a block diagram of a multi-microgrids communication topology according to the embodiment of the present invention.
Figure 4A:
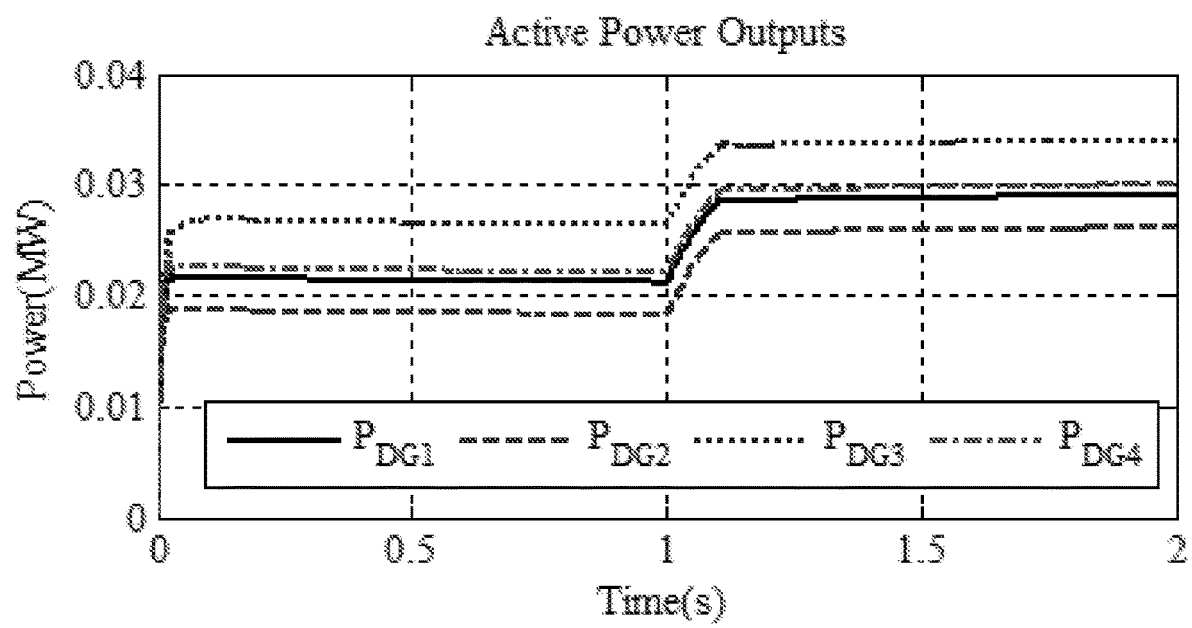
FIG. 4A is a control effect diagram of a simulation case 1 according to the embodiment of the present invention (active power outputs)
Figure 4B:
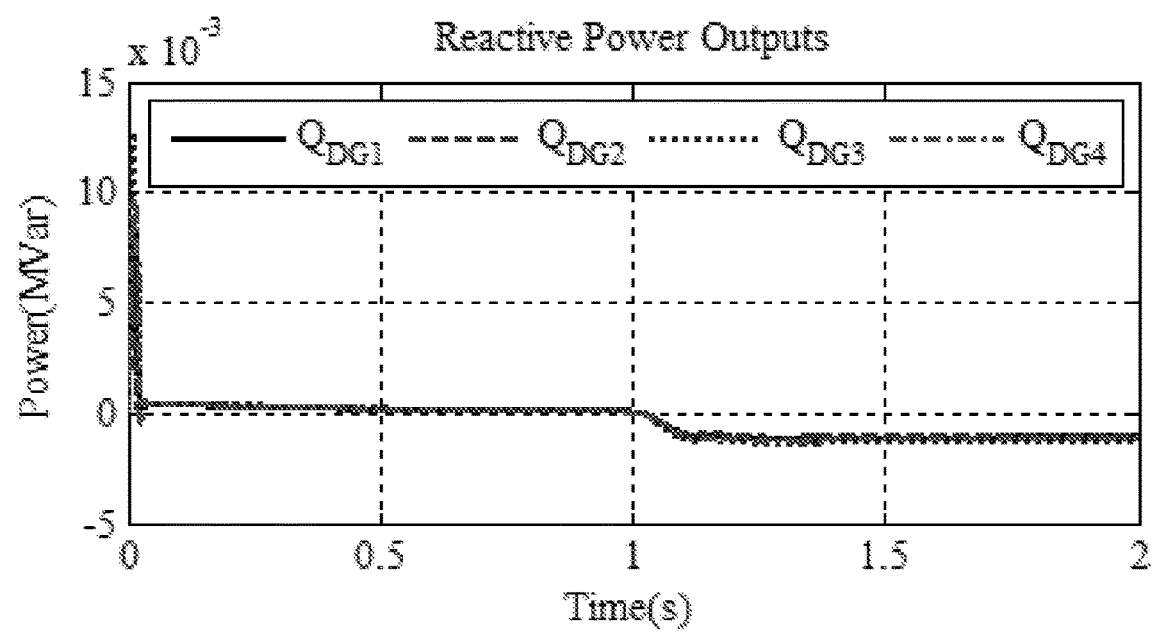
FIG. 4B is a control effect diagram of a simulation case 1 according to the embodiment of the present invention (reactive power outputs of the microgrid 1)
Figure 4C:
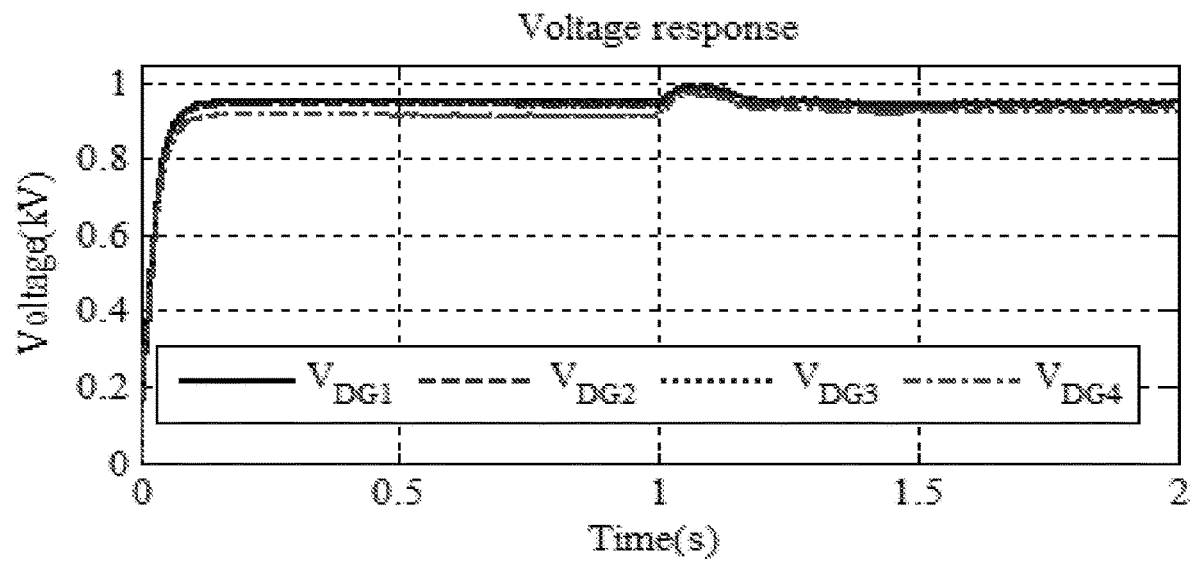
FIG. 4C is a control effect diagram of a simulation case 1 according to the embodiment of the present invention (voltage response of the microgrid 1)
Figure 4D:
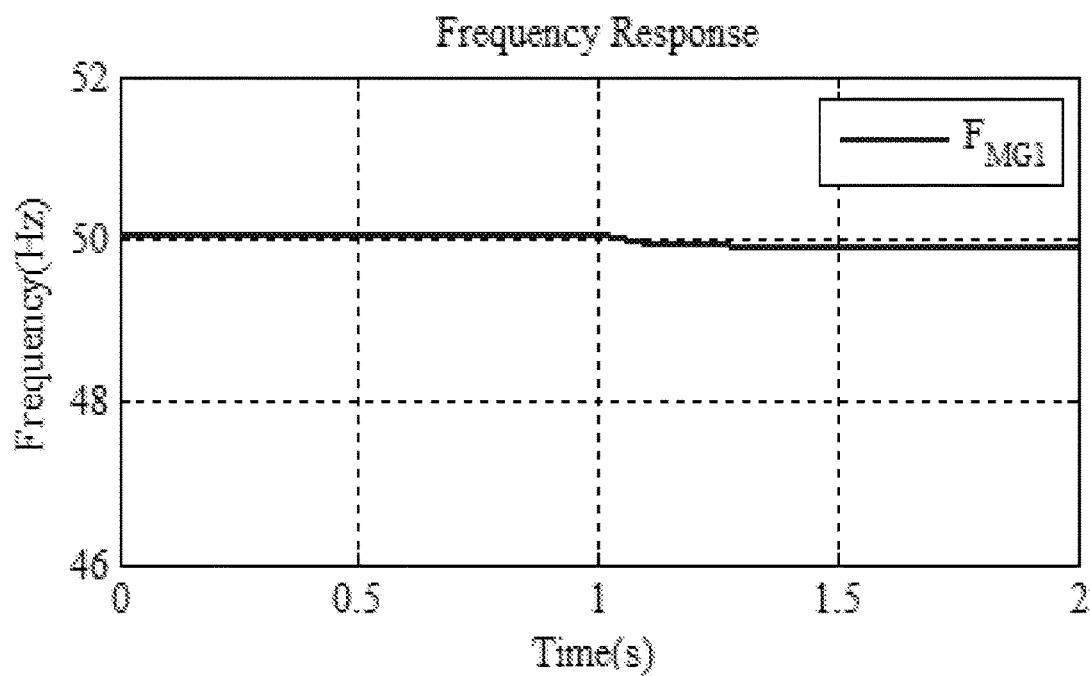
FIG. 4D is a control effect diagram of a simulation case 1 according to the embodiment of the present invention (frequency response of the microgrid 1)
Figure 4E:
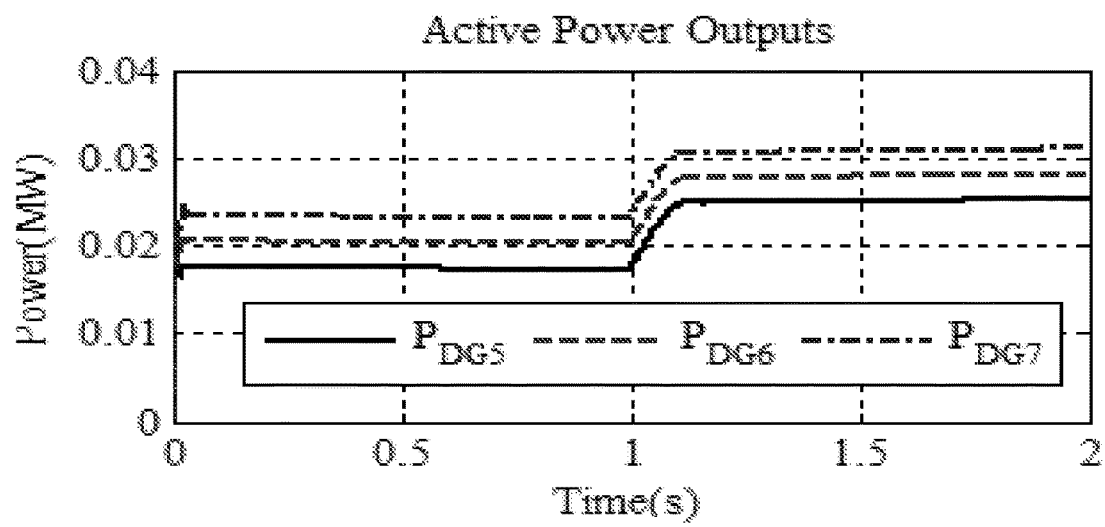
FIG. 4E is a control effect diagram of a simulation case 1 according to the embodiment of the present invention (active power outputs of the microgrid 2)
Figure 4F:
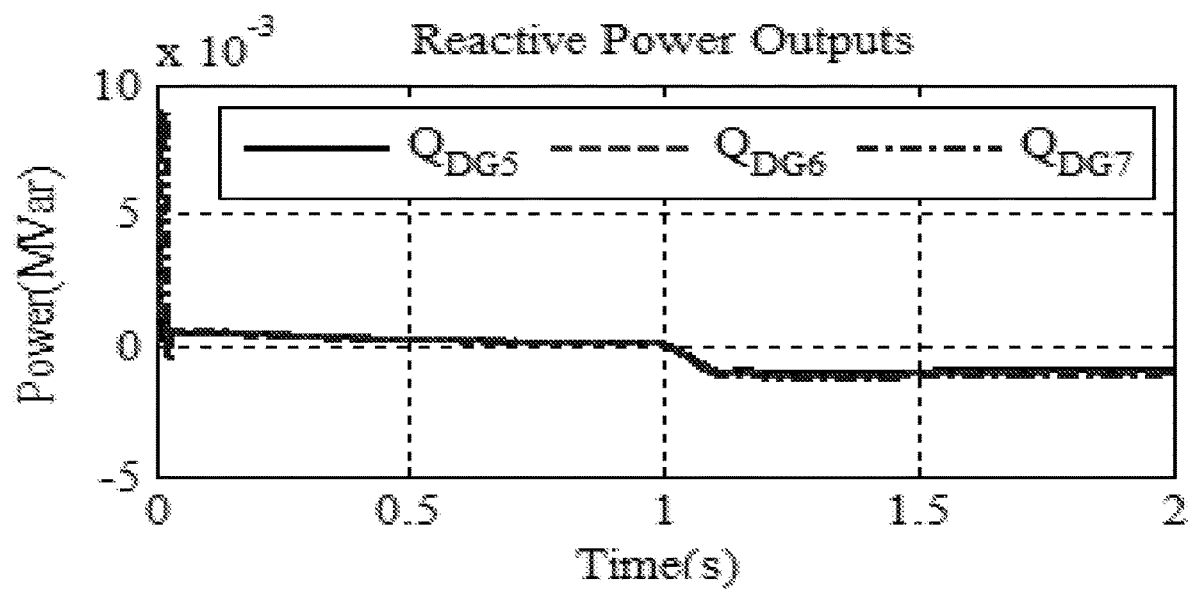
FIG. 4F is a control effect diagram of a simulation case 1 according to the embodiment of the present invention (reactive power outputs of the microgrid 2)
Figure 4G:
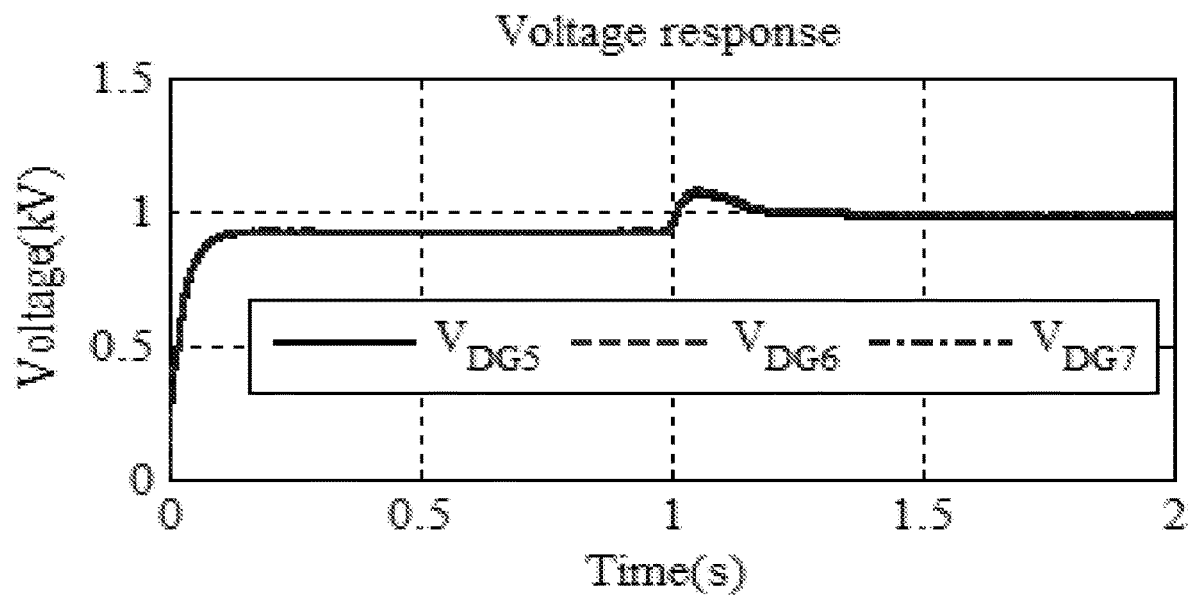
FIG. 4G is a control effect diagram of a simulation case 1 according to the embodiment of the present invention (voltage response of the microgrid 2)
Figure 4H:
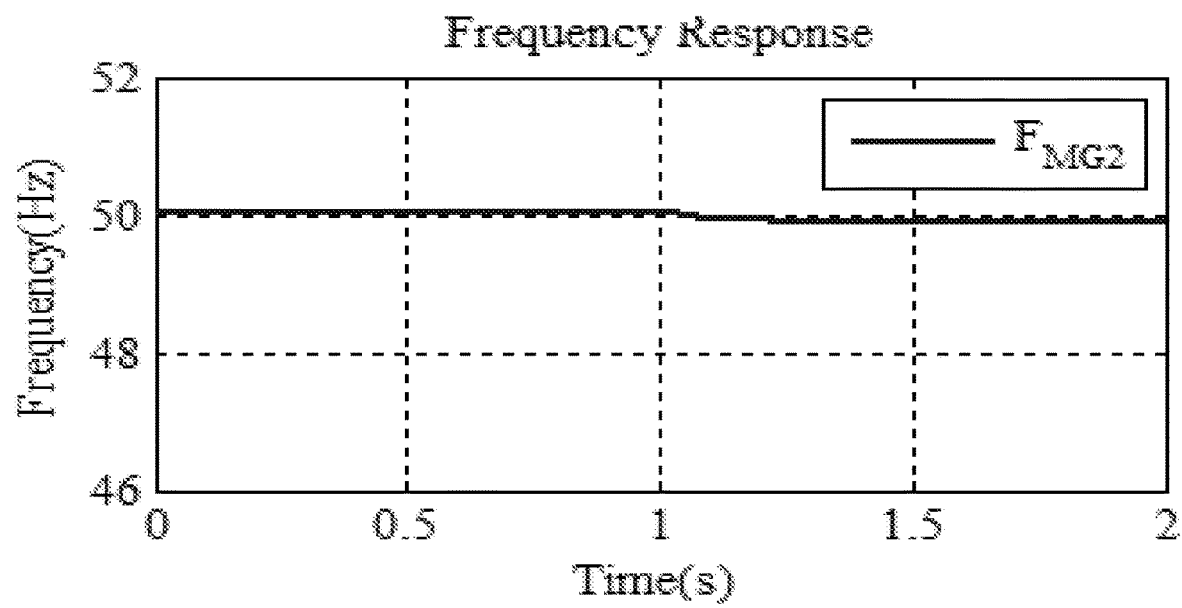
FIG. 4H is a control effect diagram of a simulation case 1 according to the embodiment of the present invention (frequency response of the microgrid 2)
Figure 4I:
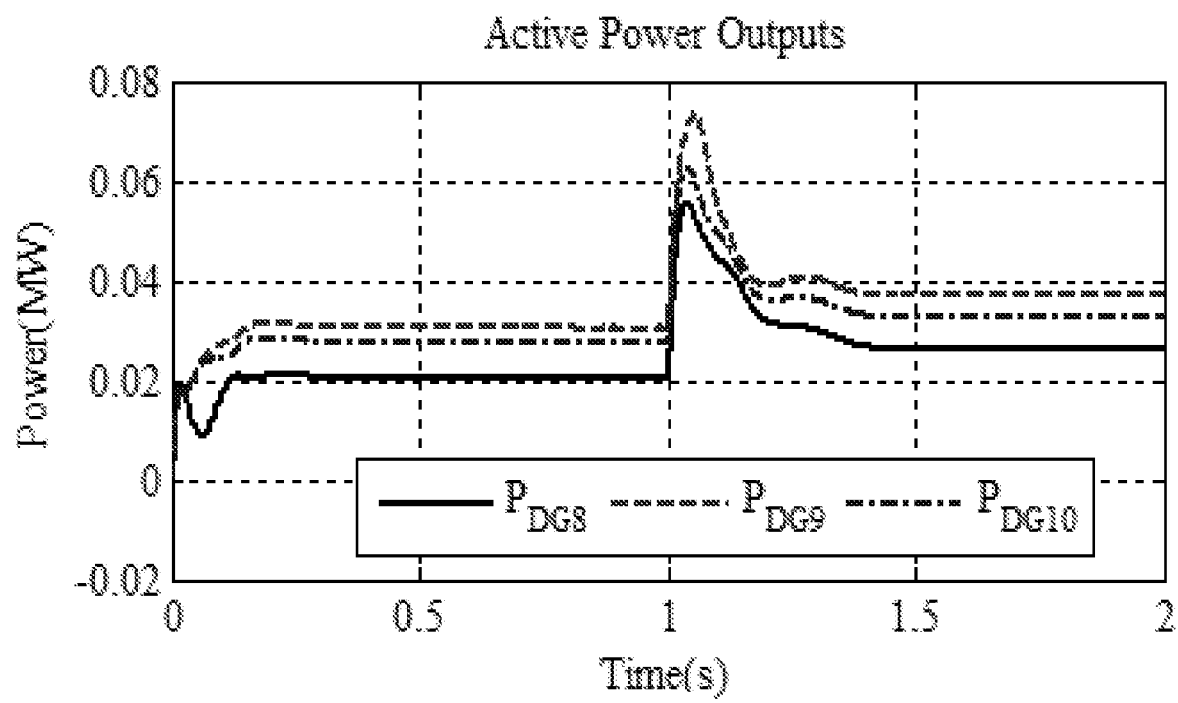
FIG. 4I is a control effect diagram of a simulation case 1 according to the embodiment of the present invention (active power outputs of the microgrid 3)
Figure 4J:
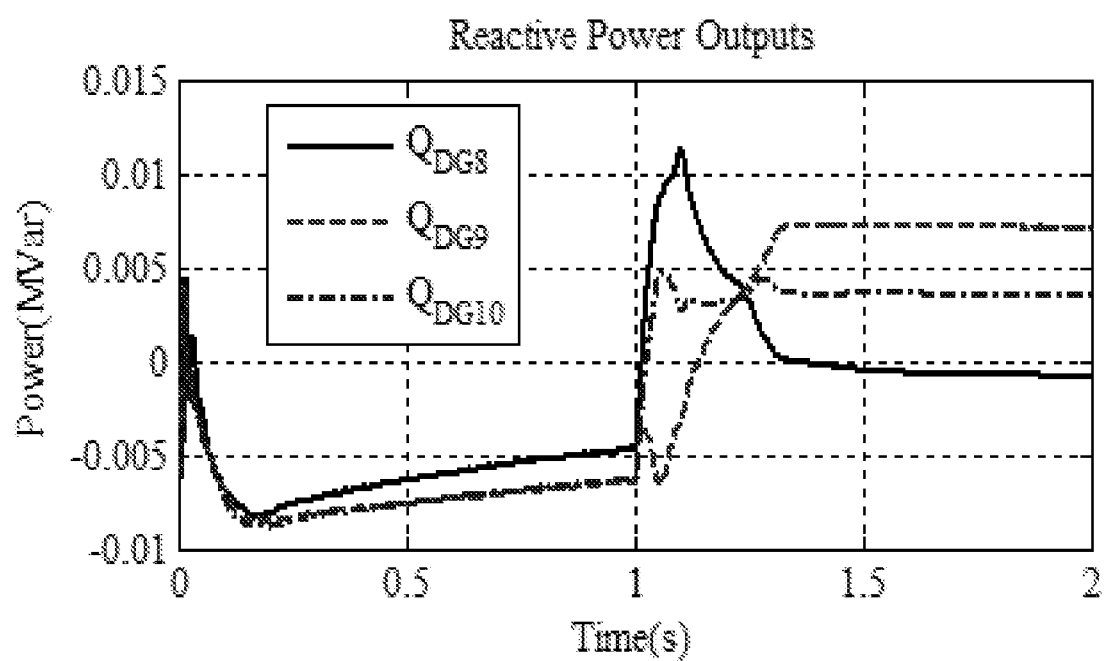
FIG. 4J is a control effect diagram of a simulation case 1 according to the embodiment of the present invention (reactive power outputs of the microgrid 3)
Figure 4K:
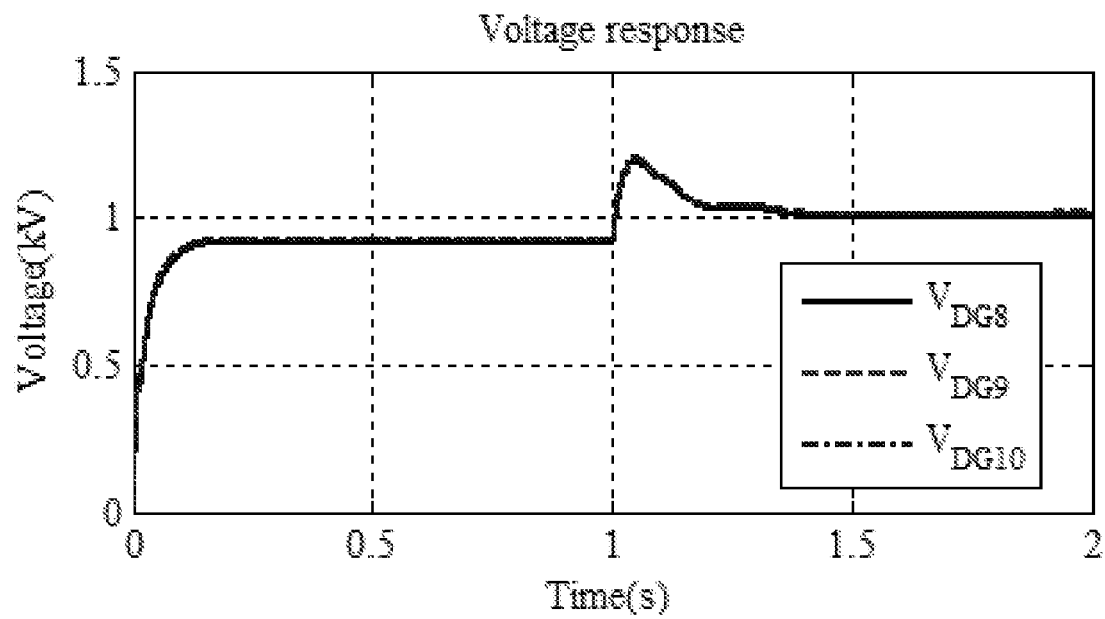
FIG. 4K is a control effect diagram of a simulation case 1 according to the embodiment of the present invention (voltage response of the microgrid 3)
Figure 4L:
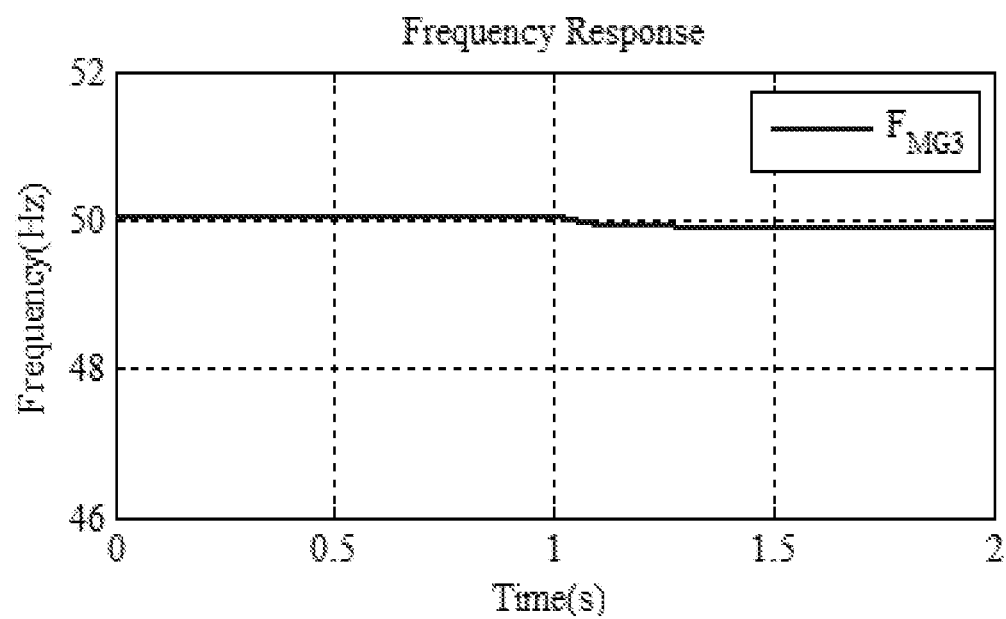
FIG. 4L is a control effect diagram of a simulation case 1 according to the embodiment of the present invention (frequency response of the microgrid 3)
Figure 5A:
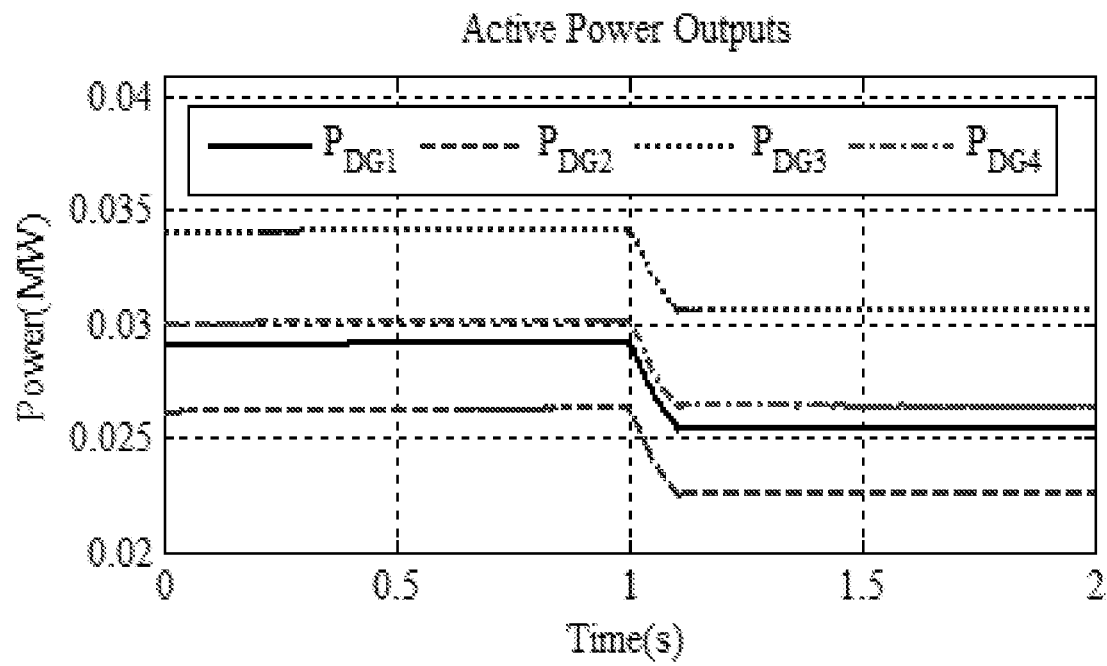
FIG. 5A is a control effect diagram of a simulation case 2 according to the embodiment of the present invention (active power outputs)
Figure 5B:
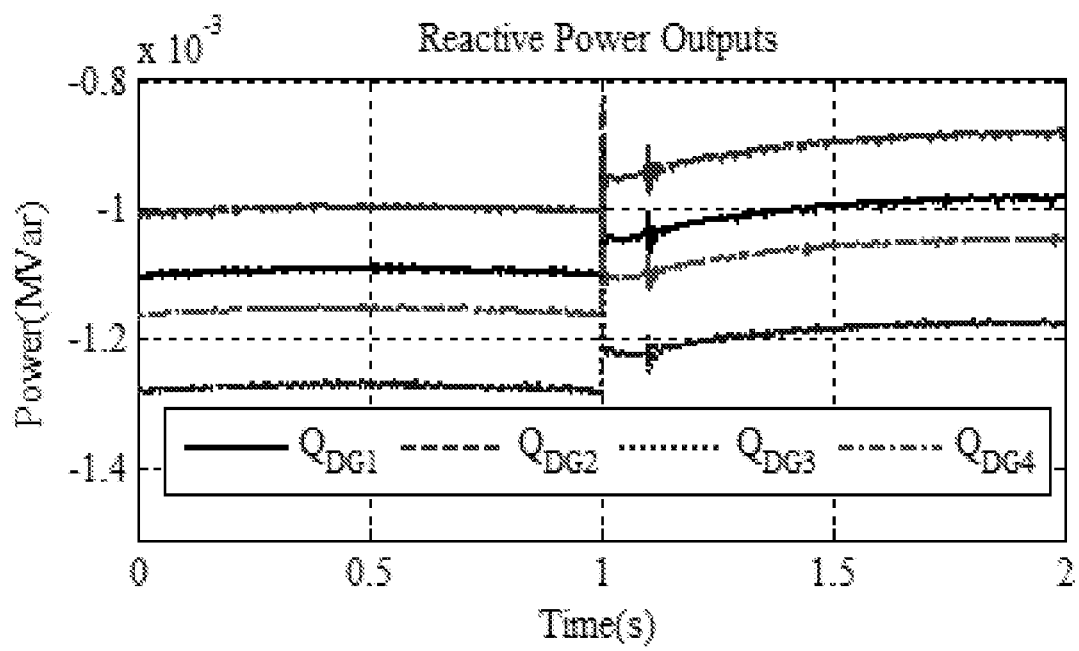
FIG. 5B is a control effect diagram of a simulation case 2 according to the embodiment of the present invention (reactive power outputs)
Figure 5C:
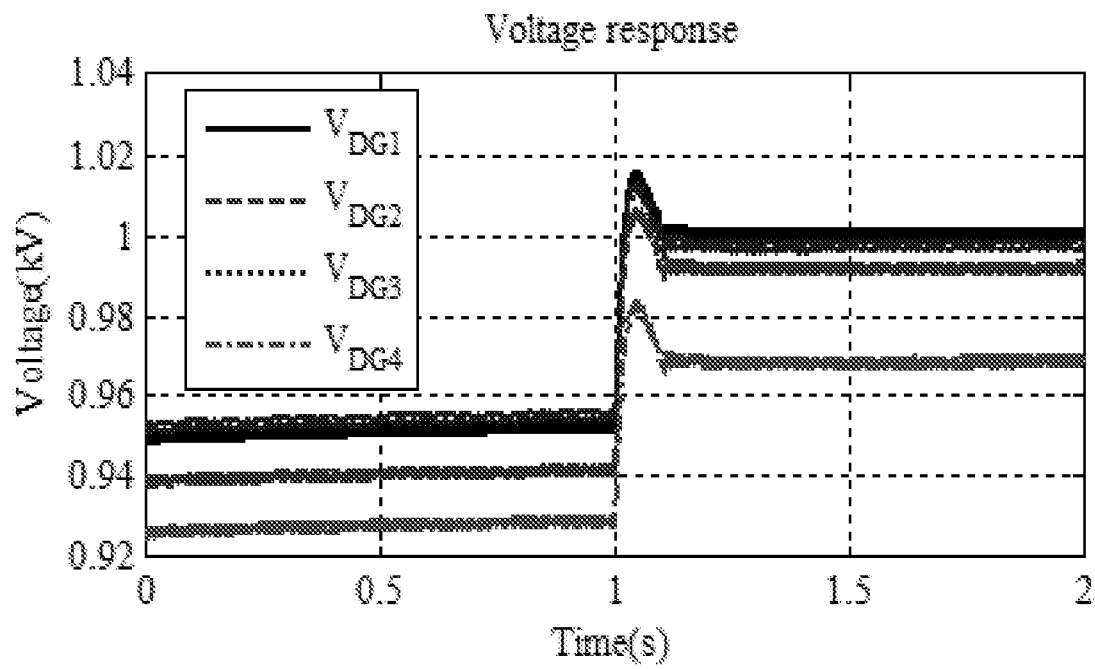
FIG. 5C is a control effect diagram of a simulation case 2 according to the embodiment of the present invention (voltage response)
Figure 5D:
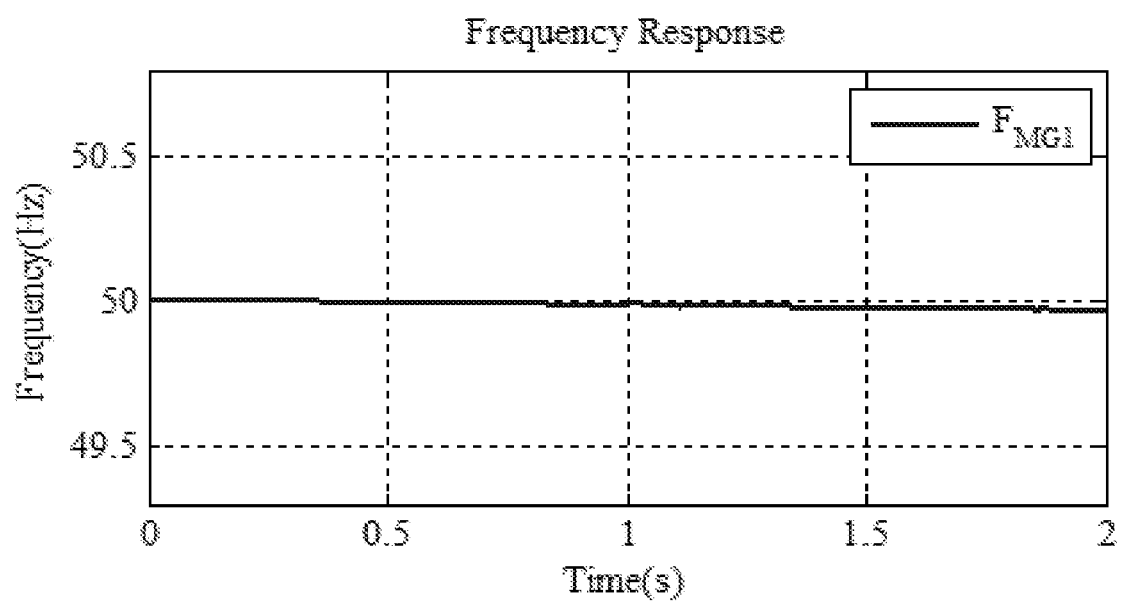
FIG. 5D is a control effect diagram of a simulation case 2 according to the embodiment of the present invention (frequency response)

FIG. 2 is a structural diagram of multi-microgrid simulation adopted in the embodiment. The simulation model consists of ten distributed power supplies (referred to as DG) and five load units (Load1, Load2, Load3, Load4 and Load5). Each distributed power supply is connected to a 0.4 kV low-voltage distribution grid by power electronic components. A system has PQ-controlled distributed power supply clusters and one droop-controlled distributed power supply clusters, which are corresponding to a microgrid 1, a microgrid 2 and a microgrid 3 respectively. There are a total of ten distributed power agents which are respectively denoted by A1, A2, A3, A4, A5, A6, A7, A8, A9 and A10, where A4 is the pinned agent of the PQ-controlled cluster 1, A5 is the pinned agent of the PQ-controlled cluster 2, and A8 is the pinned agent of the PQ-controlled cluster 3. One agent can only be communicated with the agents directly neighboring the agent on the communication topology. A simulation microgrid model is built based on a power systems computer aided design/electromagnetic transients including DC (referred to as PSCAD/EMTDC in English) platform, a multi-agent system is simulated in a matrix lab (referred to as MATLAB in English), a multi-microgrids distributed control algorithm program based on pinned clusters for the multi-agent system is established, and a user-defined interface (referred to as UDI in English) model in the PSACD is utilized to jointly operate the algorithm in the MATLAB with the power systems computer aided design (referred to as PSCAD in English) model, so as to realize the simulation verification of the control method of the present invention by using a joint simulation technique.

Simulation is conducted regarding the disturbance of the multi-microgrids in an islanded mode to verify the control effect of the method of the present invention. In the simulation system, A1 to A7 work in a PQ control (PQ control) mode, and A8 to A10 work in a droop control (Droop control) mode. Three simulation cases are set in the embodiment.

The case 1 is to transfer the multi-microgrids from a grid-connected mode to islanded mode. At the beginning of the simulation, the multi-microgrids operate in the grid-connected mode, and the multi-microgrids is disconnected from the main grid at t=1 s. Each microgrid operates independently and the droop-controlled distributed power supplies maintain the power balance of the microgrid through primary control. In secondary control, firstly, the global coordination for pinning control of the distributed power clusters is used to convert the power deficiencies of the multi-microgrids into the pre-defined pinning consensus values of the distributed power clusters; then the agents in each distributed power supply cluster seek to track and synchronize with the pinned agents to reach the predefined group consistency values; and finally, the distributed power supply clusters adjust the output powers according to the pre-defined group consensus values. The simulation results are as shown in FIG. 4. FIG. 4($a$) represents the active power changes of each distributed power supply in a microgrid 1, FIG. 4($b$) represents the reactive power changes of each distributed power supply in the microgrid 1, FIG. 4($c$) represents the voltage changes of each distributed power supply in the microgrid 1, and FIG. 4($d$) represents the frequency changes of the microgrid 1. It can be seen from FIG. 4($a$) to FIG. 4($d$) that the PQ-controlled microgrid 1 can maintain the power balance, and substantially recover the voltage of the distributed power supply and the system frequency in an islanded mode. FIG. 4($e$) represents the active power changes of each distributed power supply in a microgrid 2, FIG. 4($f$) represents the reactive power changes of each distributed power supply in the microgrid 2, FIG. 4($g$) represents the voltage changes of each distributed power supply in the microgrid 2, and FIG. 4($h$) represents the frequency changes of the microgrid 2. It can be seen from FIG. 4($e$) to FIG. 4($h$) that the PQ-controlled microgrid 2 can maintain the power balance, and substantially recover the voltage of the distributed power supply and the system frequency in an islanded mode. FIG. 4($i$) represents the active power changes of each distributed power supply in a microgrid 3, FIG. 4($j$) represents the reactive power changes of each distributed power supply in the microgrid 3, FIG. 4($k$) represents the voltage changes of each distributed power supply in the microgrid 3, and FIG. 4($l$) represents the frequency changes of the microgrid 3. It can be seen from FIG. 4($i$) to FIG. 4($l$) that the PQ-controlled microgrid 3 can maintain the power balance, and substantially recover the voltage of the distributed power supply and the system frequency in an islanded mode.

The case 2 is specific to local autonomous control to eliminate local disturbances. At the beginning of the simulation, the multi-microgrids operate in an islanded mode. At t=1 s, the microgrid 1 experiences a sudden load decreasing. A1, A2 and A3 change the corresponding output powers by tracking and synchronizing with the pinned agent A4, while the microgrid 2 and the microgrid 3 keep unchanged, and the simulation results are as shown in FIG. 5. FIG. 5($a$) represents the active power changes of each distributed power supply in the islanded microgrid 1, FIG. 5($b$) represents the reactive power changes of each distributed power supply in the islanded microgrid 1, FIG. 5($c$) represents the voltage changes of each distributed power supply in the islanded microgrid 1, and FIG. 5($d$) represents the frequency changes of the islanded microgrid 1. It can be seen from FIG. 5 that when the microgrid 1 experiences a sudden load decreasing, each distributed power supply can collaboratively adjust the output power to substantially maintain the system frequency unchanged.

Figure 6A:
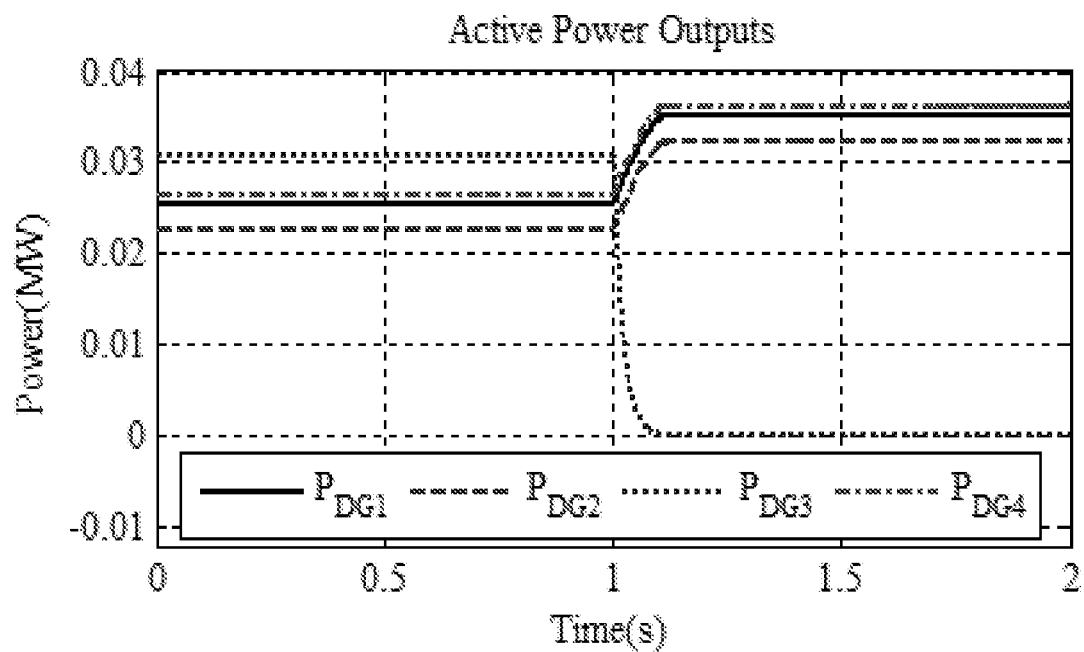
FIG. 6A is a control effect diagram of a simulation case 3 according to the embodiment of the present invention (active power outputs)
Figure 6B:
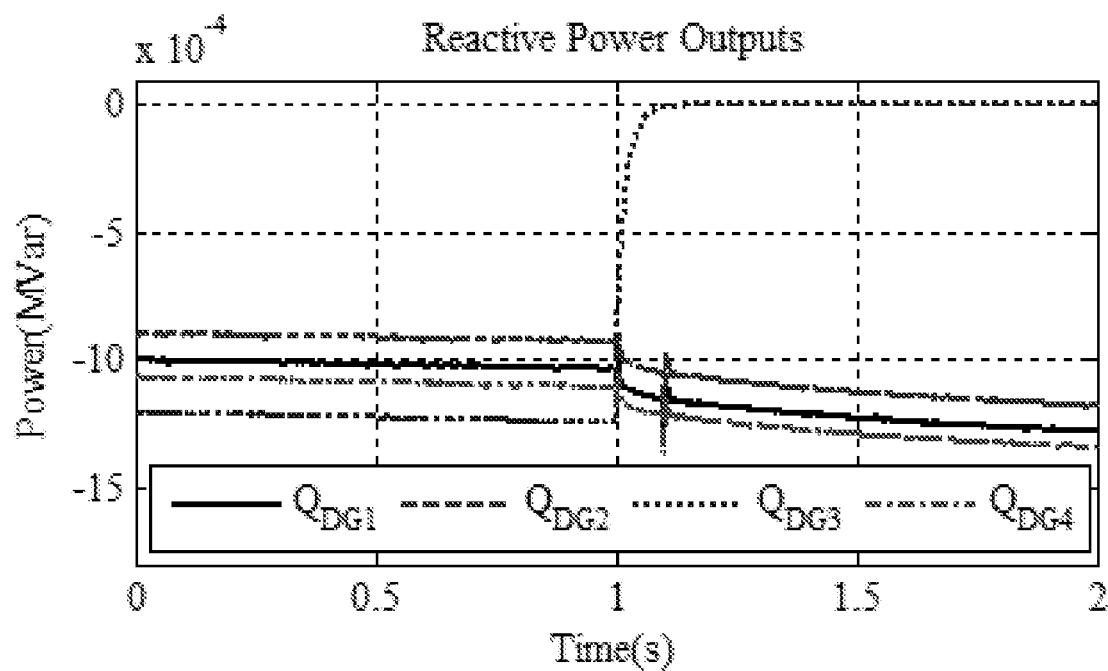
FIG. 6B is a control effect diagram of a simulation case 3 according to the embodiment of the present invention (reactive power outputs)
Figure 6C:
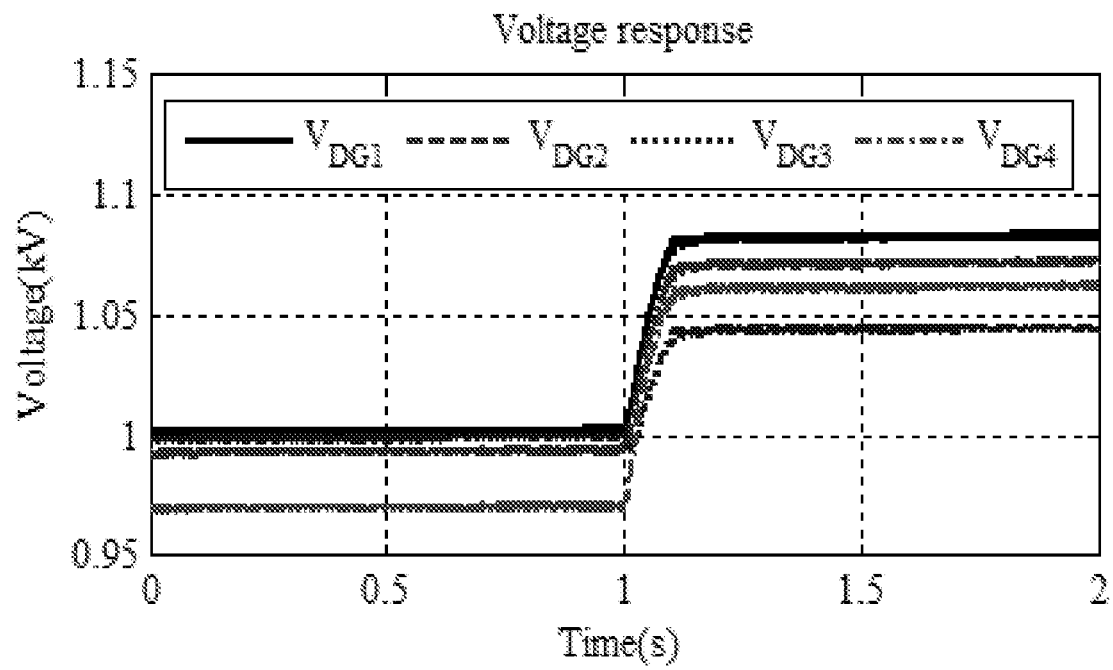
FIG. 6C is a control effect diagram of a simulation case 3 according to the embodiment of the present invention (voltage response)
Figure 6D:
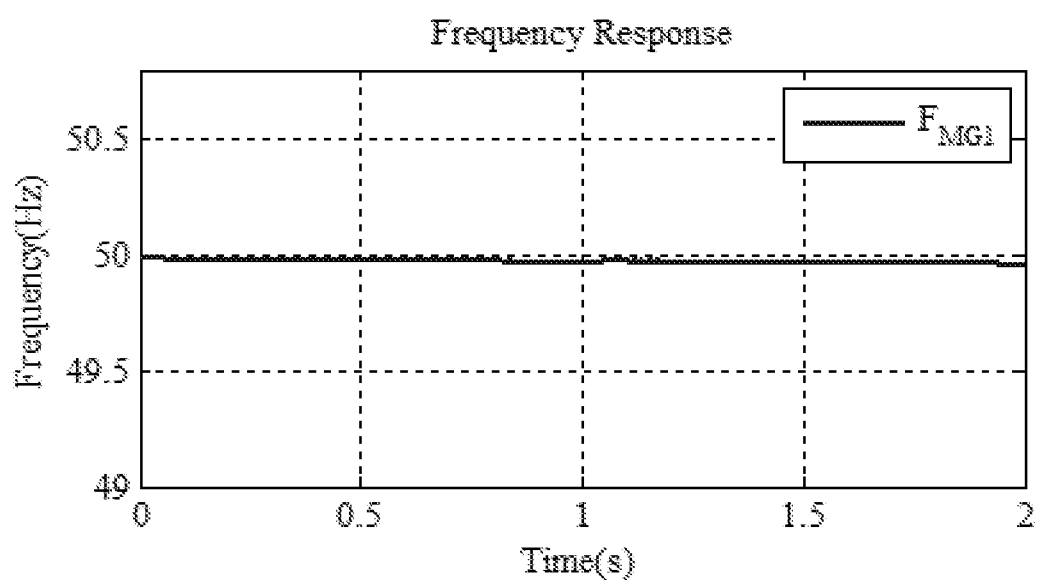
FIG. 6D is a control effect diagram of a simulation case 3 according to the embodiment of the present invention (frequency response).

The case 3 is specific to uncertain communication topology changes. At the beginning of the simulation, the multi-microgrids operate in an islanded mode; at t=1 s, DG3 in the islanded microgrid 1 plugs out because of faults, and the corresponding communication topology is changed; as shown in FIG. 2, the pre-defined group consensus values of the microgrid 1 are changed, A1 and A2 track and synchronize with the pinned agent A4 in a distributed manner to increase the output powers so as to maintain the power balance, and recover the system voltage and frequency. The simulation results are as shown in FIG. 6. FIG. 6($a$) represents the active power changes of each distributed power supply in the islanded microgrid 1, FIG. 6($b$) represents the reactive power changes of each distributed power supply in the islanded microgrid 1, FIG. 6(c) represents the voltage changes of each distributed power supply in the islanded microgrid 1, and FIG. 6(d) represents the frequency changes of the islanded microgrid 1. It can be seen from FIG. 6 that after DG3 in the microgrid 1 plugs out, the rest distributed power supplies can collaboratively undertake the power reduced by the plugging out of DG3, so as to keep the system frequency unchanged.

It can be seen from the embodiment that effective distributed collaborative control can be conducted on the multi-microgrids after adopting the control method of the present invention. Each distributed power cluster maintains the power balance of the system and recovers the system frequency and voltage through primary control and secondary control, indicating that the method proposed by the present invention has good control effects.

What is claimed is:

1. A general distributed control method for multi-microgrids with PQ control and droop control, wherein the multi-microgrids comprise m droop-controlled distributed power supply clusters and n PQ-controlled distributed power supply clusters; a multi-agent system is responsible for the control and mutual information interaction of the distributed power supplies in the multi-microgrids, each distributed power supply is corresponding to one agent, and the number of the distributed power supplies is the same as the number of the agents corresponding to the distributed power supplies; wherein, part of the agents are pinned and controlled, while other agents are tracked and synchronized in a distributed manner through communication coupling with the pinned agents; and the control method comprises the following steps of:

step 10) conducting primary control to maintain the power balance of the multi-microgrids;

step 20) determining predefined group consensus values of the pinned agents; wherein specifically comprises: determining the predefined group consensus values of the pinned agents under uncertain communication topologies, which comprises the pre-defined group consensus values of the droop-controlled pinned agents and the pre-defined group consensus values of the PQ-controlled pinned agents;

determining the distribution coefficients of the droop-controlled distributed power supply clusters according to formula (2):

$$\lambda_{k,D}^P = \frac{\sum_{k,i} \omega_{k,D,i} \sigma_{k,D,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P},$$

$$\lambda_{k,D}^Q = \frac{\sum_{k,i} \omega_{k,D,i} \sigma_{k,D,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

formula (2)

where, $\lambda_{k,D}^P$ indicates the active distribution coefficient of the k-th droop-controlled distributed power supply cluster; $\omega_{k,D,i}$ indicates the participation factor of the agent i in the k-th droop-controlled distributed power supply cluster; if the distributed power supply corresponding to the agent i participates in secondary control, then $\omega_{k,D,i}=1$; otherwise, $\omega_{k,D,i}=0$; $\sigma_{k,D,i}^P$ indicates the active capacity of the agent i in the k-th droop-controlled distributed power supply cluster, $\omega_{k,PQ,i}$ indicates the participation factor of the agent i in the k-th PQ-controlled distributed power supply cluster; if the distributed power supply corresponding to the agent i participates in secondary control, then $\omega_{k,PQ,i}=1$, otherwise $\omega_{k,PQ,i}=0$; $\sigma_{k,PQ,i}^P$ indicates the active capacity of the agent i in the k-th PQ-controlled distributed power supply cluster, $\lambda_{k,D}^Q$ indicates the reactive distribution coefficient of the k-th droop-controlled distributed power supply cluster, $\sigma_{k,D,i}^Q$ indicates the reactive capacity of the agent i in the k-th droop-controlled distributed power supply cluster, and $\sigma_{k,PQ,i}^Q$ indicates the reactive capacity of the agent i in the k-th PQ-controlled distributed power supply cluster;

determining the distribution coefficients of the PQ-controlled distributed power supply clusters according to formula (3):

$$\lambda_{k,PQ}^P = \frac{\sum_{k,i} \omega_{k,PQ,i} \sigma_{k,PQ,i}^P}{\sum_{k,D}\sum_{k,i} \omega_{k,D,i} \sigma_{k,D,i}^P + \sum_{k,PQ}\sum_{k,i} \omega_{k,PQ,i} \sigma_{k,PQ,i}^P},$$

$$\lambda_{k,PQ}^Q = \frac{\sum_{k,i} \omega_{k,PQ,i} \sigma_{k,PQ,i}^Q}{\sum_{k,D}\sum_{k,i} \omega_{k,D,i} \sigma_{k,D,i}^Q + \sum_{k,PQ}\sum_{k,i} \omega_{k,PQ,i} \sigma_{k,PQ,i}^Q}$$

formula (3)

where, $\lambda_{k,PQ}^P$ indicates the active distribution coefficient of the k-th PQ-controlled distributed power supply cluster; $\omega_{k,PQ,i}$ indicates the participation factor of the agent i in the k-th PQ-controlled distributed power supply cluster; if the distributed power supply participates in secondary control, then $\omega_{k,PQ,i}=1$; otherwise $\omega_{k,PQ,i}=0$; $\sigma_{k,PQ,i}^P$, indicates the active capacity of the agent i in the PQ-controlled distributed power supply cluster, $\lambda_{k,PQ}^Q$ indicates the reactive distribution coefficient of the k-th PQ-controlled distributed power supply cluster, and $\sigma_{k,PQ,i}^Q$ indicates the reactive capacity of the agent i in the k-th PQ-controlled distributed power supply cluster;

determining the pre-defined group consensus values of the droop-controlled pinned agents according to formula (4):

$$\Delta P_{k,D}^* = \frac{\lambda_{k,D}^P \Delta P_{MG}^*}{\eta_{k,D}} \quad \Delta Q_{k,D}^* = \frac{\lambda_{k,D}^Q \Delta Q_{MG}^*}{\eta_{k,D}}$$

$$\Delta f_k^* = m_{P,i} \Delta P_{k,D}^* \quad \Delta U_k^* = n_{Q,i} \Delta Q_{k,D}^*$$

formula (4)

where, $\Delta P_{k,D}^*$ indicates the preset active group consensus value of the k-th droop-controlled distributed power supply cluster, $\Delta P_{MG}^*$ indicates the active deficiencies in the entire multi-microgrids, $\eta_{k,D}$ indicates the total number of nonzero participation factors in the k-th droop-controlled distributed power supply cluster, $\Delta Q_{k,D}^*$ indicates the preset reactive group consensus value of the k-th droop-controlled distributed power supply cluster, $\Delta Q_{MG}^*$ indicates the reactive deficiencies in the entire multi-microgrids, $\Delta f_k^*$ indicates the preset frequency group consensus value of the k-th droop-controlled distributed power supply cluster, $\Delta U_k^*$ indicates the preset voltage group consensus value of the k-th droop-controlled distributed power supply cluster, $m_{P,i}$ indicates an active droop coefficient, and $n_{Q,i}$ indicates a reactive droop coefficient;

determining the pre-defined group consensus values of the PQ-controlled pinned agents according to formula (5):

$$\Delta P_{k,PQ}^* = \frac{\lambda_{k,PQ}^P \Delta P_{MG}^*}{\eta_{k,PQ}}, \Delta Q_{k,PQ}^* = \frac{\lambda_{k,PQ}^Q \Delta Q_{MG}^*}{\eta_{k,PQ}} \quad \text{formula (5)}$$

where, $\Delta P_{k,PQ}^*$ indicates the preset active group consensus value of the k-th PQ-controlled distributed power supply cluster, $\Delta P_{MG}^*$ indicates the active deficiencies in the entire multi-microgrids, and $\eta_{k,PQ}$ indicates the total number of nonzero participation factors in the k-th PQ-controlled distributed power supply cluster; $\Delta Q_{k,PQ}^*$ indicates the preset reactive group consensus value of the k-th PQ-controlled distributed power supply cluster, and $\Delta Q_{MG}^*$ indicates the reactive deficiencies in the entire multi-microgrids.

step 30) the pinned agent in each DG-cluster pins other existing agents through the communication coupling between them and seeks synchronization of these pre-defined group consensus values; and step 40) adjusting output powers to complete secondary control.

2. The general distributed control method for multi-microgrids with PQ control and droop control according to claim 1, wherein the step 10) specifically comprises: automatically conducting primary control as shown in formula (1) by the droop-controlled distributed power supply clusters when the multi-microgrids are disturbed in an islanded mode, and operating the droop-controlled distributed power supplies in a peer-to-peer control mode to maintain the power balance of the multi-microgrids:

$$f_i = f_{n,i} - m_{P,i}(P_i - P_{0,i})$$

$$U_i = U_{n,i} - n_{Q,i}(Q_i - Q_{0,i}) \quad \text{formula (1)}$$

where, $f_i$ indicates the frequency of the i-th droop-controlled distributed power supply, $f_{n,i}$ indicates the initial value of the frequency of the i-th droop-controlled distributed power supply, $m_{P,i}$ indicates the active droop coefficient of the i-th droop-controlled distributed power supply, $P_i$ indicates the active power outputted by the i-th droop-controlled distributed power supply, $P_{0,i}$ indicates the initial value of the active power of the i-th droop-controlled distributed power supply, and $U_i$ indicates the voltage of the i-th droop-controlled distributed power supply; $U_{n,i}$ indicates the reference value of the i-th droop-controlled distributed power supply; $n_{Q,i}$ indicates the reactive droop coefficient of the i-th droop-controlled distributed power supply; $Q_i$ indicates the reactive power outputted by the i-th droop-controlled distributed power supply; and $Q_{0,i}$ indicates the initial value of the reactive power of the i-th droop-controlled distributed power supply.

3. The general distributed control method for multi-microgrids with PQ control and droop control according to claim 1, wherein the step 30) specifically comprises: tracking and synchronizing other agents in and among the distributed power supply clusters with the pinned agents through pinning control, so as to seek and reach the pre-defined group consensus:

determining the control error $e_{fUk,i}$ of the i-th droop-controlled distributed power supply agent according to formula (6):

$$e_{fUK,i} = \begin{bmatrix} e_{fk,i} \\ e_{Uk,i} \end{bmatrix} = \begin{bmatrix} \Delta f_{n,i} - \Delta f_k^* \\ \Delta U_{n,i} - \Delta U_k^* \end{bmatrix} \quad \text{formula (6)}$$

where, $e_{fk,i}$ indicates the frequency control error of the i-th droop-controlled distributed power supply agent, $e_{Uk,i}$ indicates the voltage control error of the i-th droop-controlled distributed power supply agent, $\Delta f_{n,i}$ indicates the frequency correction of the i-th droop-controlled distributed power supply agent in the secondary control, and $\Delta U_{n,i}$ indicates the voltage correction of the i-th droop-controlled distributed power supply agent in the secondary control;

determining the control error $e_{PQk,i}$ of the i-th PQ-controlled distributed power supply agent according to formula (7):

$$e_{PQk,i} = \begin{bmatrix} e_{Pk,i} \\ e_{Qk,i} \end{bmatrix} = \begin{bmatrix} \Delta P_{ref,i} - \Delta P_{k,PQ}^* \\ \Delta Q_{ref,i} - \Delta Q_{k,PQ}^* \end{bmatrix} \quad \text{formula (7)}$$

where, $e_{PK,i}$ indicates the active power control error of the i-th PQ-controlled distributed power supply agent, $e_{Qk,i}$ indicates the reactive power control error of the i-th PQ-controlled distributed power supply agent, $\Delta P_{ref,i}$ indicates the active power correction of the i-th PQ-controlled distributed power supply agent in the secondary control, and $\Delta Q_{ref,i}$ indicates the reactive power correction of the i-th PQ-controlled distributed power supply agent in the secondary control;

conducting pinning control to the agent i in the k-th droop-controlled distributed power supply cluster through formula (8):

$$\dot{e}_{fUk,i} = \quad \text{formula (8)}$$

$$\begin{cases} \sum_{j \in N_{k,i,\Theta_m(t)}} \alpha_{i,j,\Theta_m(t)}(e_{fk,j} - e_{fk,i}) + \sum_{l \neq k} \sum_{j \in N_{l,i,\Theta_m(t)}} \beta_{i,j,\Theta_m(t)}(e_{fk,j} - e_{fk,i}) - d_{i,\Theta_m(t)} e_{fk,i} \\ \sum_{j \in N_{k,i,\Theta_m(t)}} \alpha_{i,j,\Theta_m(t)}(e_{Uk,j} - e_{Uk,i}) + \sum_{l \neq k} \sum_{j \in N_{l,i,\Theta_m(t)}} \beta_{i,j,\Theta_m(t)}(e_{Uk,j} - e_{Uk,i}) - d_{i,\Theta_m(t)} e_{Uk,i} \end{cases}$$

where, $\dot{e}_{fUk,i}$ indicates the derivative of $e_{fUk,i}$, $N_{k,i,\Theta_m(t)}$ indicates an agent set in the k-th distributed power supply cluster neighboring the agent i at time $t_m$, $\alpha_{i,j,\Theta_m(t)}$ indicates a communication coupling coefficient between the agent i and other agents in the cluster at time $t_m$; if communication lines switch on, then $\alpha_{i,j,\Theta_m(t)} \neq 0$; otherwise, $\alpha_{i,j,\Theta_m(t)} = 0$; $e_{fk,j}$ indicates the frequency control error of the droop-controlled distributed power supply agent j, and $N_{l,i,\Theta_m(t)}$ indicates an agent set in the i-th distributed power supply cluster neighboring the agent i at time $t_m$; $\beta_{i,j,\Theta_m(t)}$ indicates a communication coupling coefficient between the agent i and the agents in other clusters at time $t_m$, and if communication lines switch on, $\beta_{i,j,\Theta_m(t)} \neq 0$; otherwise, $\beta_{i,j,\Theta_m(t)} = 0$; $d_{i,\Theta_m(t)}$ indicates the pinning control gain of the agent i at time $t_m$, and $d_{i,\Theta_m(t)} \geq 0$; $d_{i,\Theta_m(t)} = 0$ indicates no pinning control over the agent i; and $e_{Uk,j}$ indicates the voltage control error of the droop-controlled distributed power supply agent j; and conducting pinning control to the agent i in the k-th PQ-controlled distributed power supply cluster through formula (9):

$$\dot{e}_{PQk,i} = \begin{cases} \sum_{j \in N_{k,i,\Theta_m(t)}} \alpha_{i,j,\Theta_m(t)}(e_{Pk,j} - e_{Pk,i}) + \sum_{l \neq k} \sum_{j \in N_{l,i,\Theta_m(t)}} \beta_{i,j,\Theta_m(t)}(e_{Pk,j} - e_{Pk,i}) - d_{i,\Theta_m(t)} e_{Pk,i} \\ \sum_{j \in N_{k,i,\Theta_m(t)}} \alpha_{i,j,\Theta_m(t)}(e_{Qk,j} - e_{Qk,i}) + \sum_{l \neq k} \sum_{j \in N_{l,i,\Theta_m(t)}} \beta_{i,j,\Theta_m(t)}(e_{Qk,j} - e_{Qk,i}) - d_{i,\Theta_m(t)} e_{Qk,i} \end{cases}$$

formula (9)

where, $\dot{e}_{PQk,i}$ indicates the derivative of $e_{PQk,i}$, $e_{Pk,j}$ indicates the active power control error of the PQ-controlled distributed power supply agent j, and $e_{Qk,j}$ indicates the reactive power control error of the PQ-controlled distributed power supply agent j.

4. The general distributed control method for multi-microgrids with PQ control and droop control according to claim 1, wherein the step 40) specifically comprises: adjusting an output power by each distributed power supply agent according to the pre-defined group consensus values reached and based on the PQ-controlled distributed power supplies, and recovering the system frequency and voltage based on the droop-controlled distributed power supplies, so as to complete the secondary control over the multi-microgrids together;

conducting the secondary control over the droop-controlled distributed power supply agent i according to formula (10):

$$f_{n,i}^S = f_{n,i} + \Delta f_{n,i}$$

$$U_{n,i}^S = U_{n,i} + \Delta U_{n,i}$$

formula (10)

where, $f_{n,i}^S$ indicates the reference frequency value of the droop-controlled distributed power supply agent i adjusted through the secondary control, $f_{n,i}$ indicates the reference frequency value of the droop-controlled distributed power supply agent i in the primary control, $\Delta f_{n,i}$ indicates the frequency correction of the droop-controlled distributed power supply agent i in the secondary control, $U_{n,i}^S$ indicates the reference voltage value of the droop-controlled distributed power supply agent i adjusted through the secondary control, $U_{n,i}$ indicates the reference voltage value of the droop-controlled distributed power supply agent i in the primary control, and $\Delta U_{n,i}$ indicates the voltage correction of the droop-controlled distributed power supply agent i in the secondary control; and conducting the secondary control over the PQ-controlled distributed power supply agent i according to formula (11):

$$P_{ref,i}^S = P_{ref,i} + \Delta P_{ref,i}$$

$$Q_{ref,i}^S = Q_{ref,i} + \Delta Q_{ref,i}$$

formula (11)

where, $P_{ref,i}^S$ indicates the active reference value of the PQ-controlled distributed power supply agent i adjusted through the secondary control, $P_{ref,i}$ indicates the initial active reference value of the PQ-controlled distributed power supply agent i, $\Delta P_{ref,i}$ indicates the active power correction of the PQ-controlled distributed power supply agent i in the secondary control, $Q_{ref,i}^S$ indicates the reactive reference value of the PQ-controlled distributed power supply agent i adjusted through the secondary control, $Q_{ref,i}$ indicates the initial reactive reference value of the PQ-controlled distributed power supply agent i, and $\Delta Q_{ref,i}$ indicates the reactive power correction of the PQ-controlled distributed power supply agent i in secondary control.

* * * * *